United States Patent
Hill et al.

(10) Patent No.: US 11,354,866 B2
(45) Date of Patent: Jun. 7, 2022

(54) DYNAMIC ADJUSTMENTS IN MIXED-REALITY ENVIRONMENT BASED ON POSITIONAL ASSUMPTIONS AND CONFIGURATIONS

(71) Applicant: MICROSOFT TECHNOLOGY LICENSING, LLC, Redmond, WA (US)

(72) Inventors: Erik Alexander Hill, Redmond, WA (US); Kathleen Carol Heasley, Redmond, WA (US); Jonathan Gustav Paulovich, Redmond, WA (US); Jake Thomas Shields, Bellevue, WA (US); Constantin Dulu, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 132 days.

(21) Appl. No.: 16/932,014

(22) Filed: Jul. 17, 2020

(65) Prior Publication Data

US 2022/0020217 A1    Jan. 20, 2022

(51) Int. Cl.
*G06T 19/00*    (2011.01)
*A63F 13/26*    (2014.01)
(Continued)

(52) U.S. Cl.
CPC ............ *G06T 19/006* (2013.01); *A63F 13/26* (2014.09); *A63F 13/537* (2014.09); *G06F 3/011* (2013.01);
(Continued)

(58) Field of Classification Search
CPC ... G06T 19/006; G06T 2210/21; G06F 3/011; A63F 13/26; A63F 13/537; A63F 2300/8082
See application file for complete search history.

(56) References Cited

U.S. PATENT DOCUMENTS

2010/0303302 A1* 12/2010 Kipman ................. G06F 3/011
                                                    345/158
2016/0140764 A1*  5/2016 Bickerstaff ............ G06V 10/56
                                                    345/633
(Continued)

FOREIGN PATENT DOCUMENTS

WO    2013173728 A1    11/2013

OTHER PUBLICATIONS

Hudson, et al., "Accelerated Occlusion Culling using Shadow Frusta", In Proceedings of the Thirteenth Annual Symposium on Computational Geometry, Aug. 1, 1997, pp. 1-10.
(Continued)

*Primary Examiner* — Steve Rowland
(74) *Attorney, Agent, or Firm* — Workman Nydegger

(57) ABSTRACT

Systems and methods are provided for generating, selecting, modifying and/or otherwise configuring occluder(s) used in mixed-reality environments. Pose information of a trackable device worn or carried by a user is determined. Based on that pose information, an assumption regarding the user's own pose is determined. An occluder is then configured in a manner to correspond to the assumed pose of the user for use in the mixed-reality environment. By generating the occluder in this manner, improved battery life by the trackable device can be achieved relative to conventional systems that rely entirely on iterative scanning of the user's body to determine body position.

10 Claims, 20 Drawing Sheets

(51) Int. Cl.
*A63F 13/537* (2014.01)
*G06F 3/01* (2006.01)
(52) U.S. Cl.
CPC ... *A63F 2300/8082* (2013.01); *G06T 2210/21* (2013.01)

(56) References Cited

U.S. PATENT DOCUMENTS

| | | | | |
|---|---|---|---|---|
| 2018/0097867 | A1* | 4/2018 | Pang | H04N 19/124 |
| 2018/0333643 | A1* | 11/2018 | Luisi | A63F 13/26 |
| 2021/0233311 | A1* | 7/2021 | Ichim | G06V 20/20 |
| 2021/0233312 | A1* | 7/2021 | Noris | G06T 19/006 |
| 2021/0314474 | A1* | 10/2021 | Yang | H04N 5/2356 |

OTHER PUBLICATIONS

"International Search Report and Written Opinion Issued in PCT Application No. PCT/US21/029256", dated Aug. 6, 2021, 12 Pages (MS# 408696-WO-PCT).

* cited by examiner

DYNAMIC ADJUSTMENTS IN MIXED-REALITY ENVIRONMENT BASED ON POSITIONAL ASSUMPTIONS AND CONFIGURATIONS

BACKGROUND

Mixed-reality (MR) systems, including virtual-reality (VR) and augmented-reality (AR) systems, have received significant attention because of their ability to create truly unique experiences for their users. For reference, conventional VR systems create completely immersive experiences by restricting their users' views to only virtual environments. This is often achieved through the use of a head mounted device (HMD) that completely blocks any view of the real world. As a result, a user is entirely immersed within the virtual environment. In contrast, conventional AR systems create an augmented-reality experience by visually presenting virtual objects that are placed in or that interact with the real world.

As used herein, VR and AR systems are described and referenced interchangeably. Unless stated otherwise, the descriptions herein apply equally to all types of MR systems, which (as detailed above) include AR systems, VR reality systems, and/or any other similar system capable of displaying virtual content (aka "hologram").

The term "occlusion," as used herein, refers to scenarios in which one object is blocking another object from being viewable in three-dimensional (3D) space within a MR environment. In the context of a MR scene, the objects can be real-world objects, holograms, or combinations of real-world objects and holograms. For instance, a hologram may be structured to occlude a real-world object. Similarly, a hologram may be structured to give the appearance as though a real-world object was occluding the hologram. In order to perform realistic occlusion, it is beneficial to closely or even perfectly align the holograms and the scene in order to maintain or provide high levels of realism and to provide realistic behavior visualizations.

To provide realistic occlusion effects, MR systems often employ what is referred to as an "occluder." An occluder operates by hiding holograms or holographic content in a manner that would reflect a real-world scenario. Specifically, an occluder is a type of object that is used to occlude an object's geometry during the rendering and display process. The occluder interacts with the MR scene by providing information to the MR scene's depth buffer. This interaction with the depth buffer enables the MR system to prevent certain selected hologram pixels from being displayed in the scene (e.g., pixels that should be hidden from view). FIGS. 1, 2, and 3 will now be referenced to provide some additional/useful context.

FIG. 1 shows a real-world head 100 and a hologram 105 in the form of glasses. Notice, the hologram 105 includes a first holographic glasses arm 110 and a second holographic glasses arm 115. In the figure on the left, the two holographic glasses arms 110 and 115 are currently displayed even though they should be hidden by the real-world head 100 (e.g., when the person is "wearing" the holographic glasses, the arms would not be visible from the illustrated perspective). In order to improve the realism of the hologram 105, MR systems are able to use an occluder 120 shaped to correspond to the shape of the real-world head 100. By enabling the occluder 120 to interact with the MR system's depth buffer, the MR system can hide the portions of the hologram 105 that should be blocked from view by the real-world head 100. The result of using the occluder 120 is shown by the hologram 125, where the previously displayed holographic glasses arms 110 and 115 are now hidden from view.

FIG. 2 provides another useful illustration of the effects of using an occluder. Here again is a real-world head 200. In this scenario, a number of holograms (e.g., hologram 205, hologram 210, hologram 215, and hologram 220) are rotating around the real-world head 200. Although not shown, an occluder is being used, as was the case in FIG. 1. Based on the current point of view, the hologram 205 is fully visible and is in front of the real-world head 200. The hologram 210 is also partially blocking or occluding view of the real-world head 200. In contrast, the hologram 215 is almost entirely hidden by the occluder, which is shaped to correspond to the real-world head 200. Similarly, a portion of the hologram 220 is also hidden or blocked by the occluder. To clarify, because the holograms are rotating around the real-world head 200 and because the holograms 215 and 220 are at positions corresponding to the backward end of the real-world head 200 (from this perspective), a user would expect to see various portions of those holograms hidden. The occluder provides the ability to hide pixels that should be hidden from view based on the behavior of the hologram and the content in the scene or the current perspective.

FIG. 3 illustrates a real-world person 300 wearing an HMD 305. Traditional HMD systems typically utilize on very simplistic occluders, as referenced, for example by the simple occluder 310. Often, the simple occluder 310 is formed of basic shapes, such as cylinders, circles, spheres, and so forth. Furthermore, it is often the case that the simple occluder 310 fails to account for specific and changing relative poses of the real-world person 300.

In order to generate the simple occluder 310, traditional systems extensively rely on scanning operations in which an HMD uses its cameras (e.g., perhaps head tracking (HeT) cameras) to scan the environment to identify real-world objects. By analyzing the camera's images, the MR system is able to identify and parse different objects included in the environment. Once the MR system has an understanding of the environment, it is able to generate occluders for the different objects. The occluders are constantly updated based on constant scanning of the environment. Performing this constant scanning is very expensive in terms of compute and battery expenditure.

There is currently an ongoing need and desire for improved systems and methods for generating and using occluders in an MR scene and, even more particularly, for improved systems and methods for generating and using occluders while also reducing the computational expense that would normally be required to generate and use occluders with conventional systems.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments disclosed herein relate to systems, devices (e.g., hardware storage devices, wearable devices, etc.), and methods for generating, modifying, and utilizing occluders in a MR scene.

Some embodiments dynamically select and present an occluder in a MR environment based on assumptions of a user's body in the MR environment. For instance, a relative position of a physical device in the MR environment can be identified. This device is one that is being worn or held by the user, and the relative movements and positioning of the device are tracked in the MR environment based on detected sensor outputs associated with the device. Then, the system determines an assumed understanding of the user's body within the MR environment, including an assumed position of the user's body, based on the identified relative position of the physical device. Notably, this understanding does not rely on camera imaging of the user's body.

A set of occluders are also provided for selection to be used within the MR environment and to correspond with the assumed position of the user's body. Selection is then made of one or more particular occluder(s) from the set of occluders based on the assumed understanding of the user's body, and a determined relatively higher percentage of correspondence to the assumed position of the user's body, as compared to other occluders in the set.

Disclosed embodiments also include modifying the presentation of the MR environment by positioning the occluder in the MR environment with a particular size and position corresponding with the assumed understanding of the user's body.

Some embodiments also dynamically update an understanding of a user's body in a MR environment and modify the occluder(s) for the user based on updated understanding/assumptions on the assumed position of the user's body. For instance, some embodiments determine an initial understanding of the user's body within the MR environment, where the assumed understanding includes an assumed position of the user's body. An initial occluder is then presented within the MR environment, which corresponds with the initial understanding of the user's body and is based on the assumed position of the user's body. Thereafter, a relative position of a tracked device is identified, where the tracked device is worn or carried by the user (e.g., a physical device). Then, based on a detected change in a position or state of use of the tracked device, the system updates the understanding of the user's body and corresponding assumption(s) of the user's body position. The detection and update operations are based on the detected change in position or state of use of the tracked device and are performed irrespective of any camera imaging of the user's body. Then, the system modifies the occluder shape, position, or selects a new occluder to use within the MR environment to reflect the assumed body position of the user based on the detected change in position/state of the tracked device and the corresponding determined update(s) about the assumption(s) associated with the user's body position.

Some embodiments are also provided to dynamically update a so-called "player collider" for a user within the MR environment based on an understanding of the user's body. In such embodiments, for example, the player collider includes a defined region associated with the user's body. In some instances, an initial understanding of the user's body within the MR environment, including the assumed position of the user's body, is determined. This understanding is then used to generate and present the player collider within the MR environment (whether visibly or invisibly). Notably, the player collider corresponds with the initial understanding of the user's body and is based on the assumed position of the user's body.

Thereafter, an application executing in the MR environment will trigger a MR event when an object in the MR environment and the player collider spatially intersect or collide. In some instances, the system identifies a relative position of a tracked device that is worn or carried by the user (e.g., a physical device) and also detects a change in a position or state of use of the tracked device. The detected relative position and/or state of the device is then used to update the understanding of the user's body and corresponding assumption(s) in the position of the user's body, irrespective of and without relying on any camera imaging of the user's body. In some instances, the system also modifies a size and/or position of the player collider within the MR environment based on the updated assumptions used to define the understanding of the user's body position.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
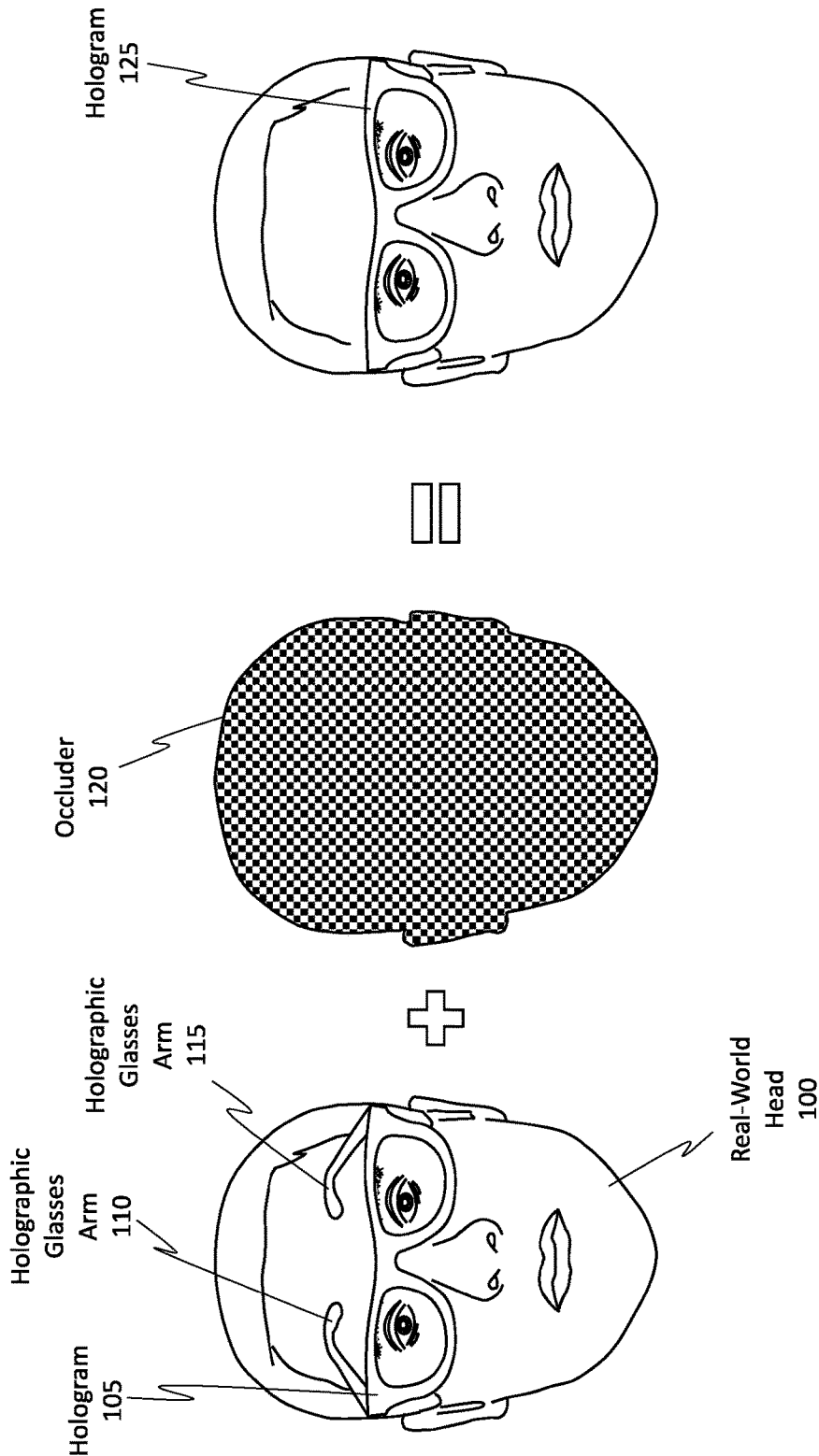
FIG. 1 illustrates an example usage of an occluder to block pixels that should be hidden from view.
Figure 2:
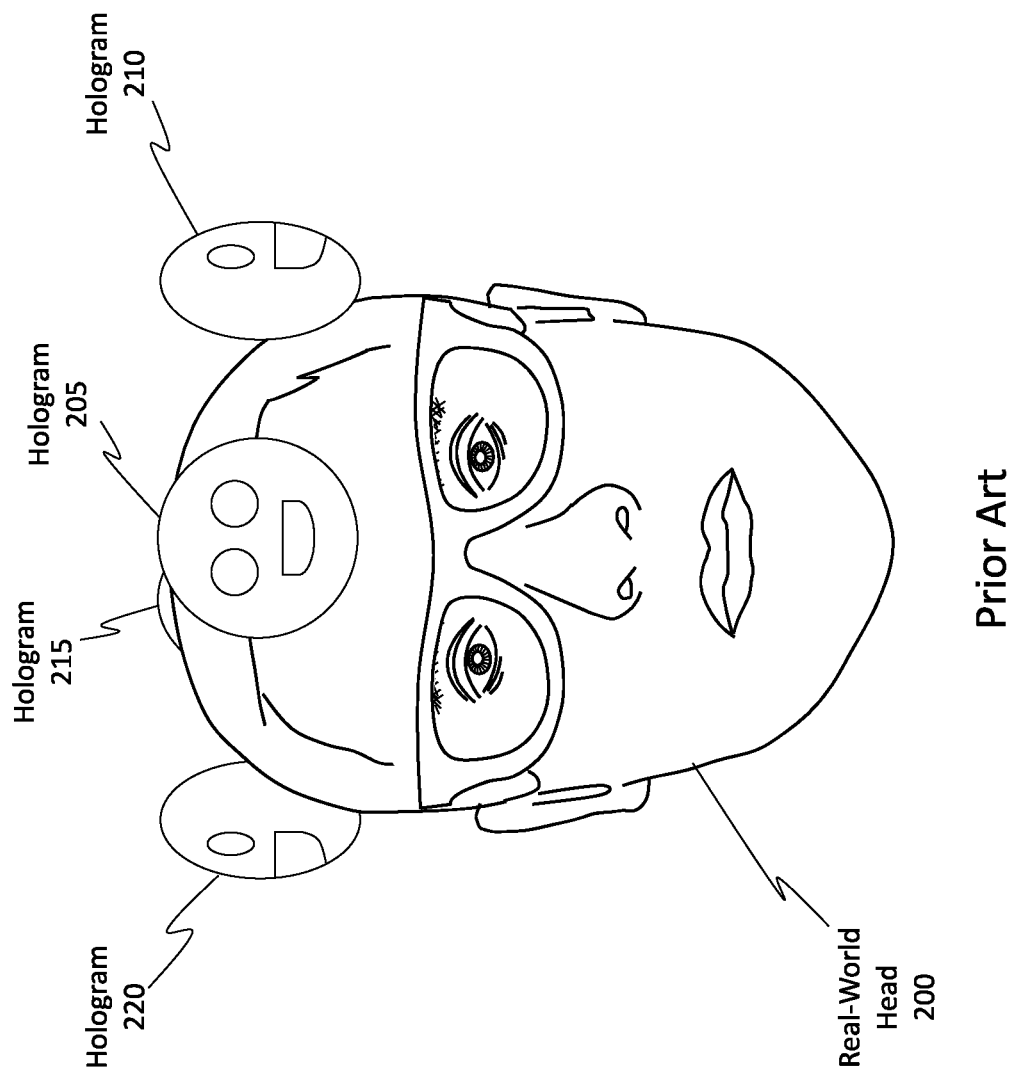
FIG. 2 illustrates another example usage of an occluder to block pixels.
Figure 3:
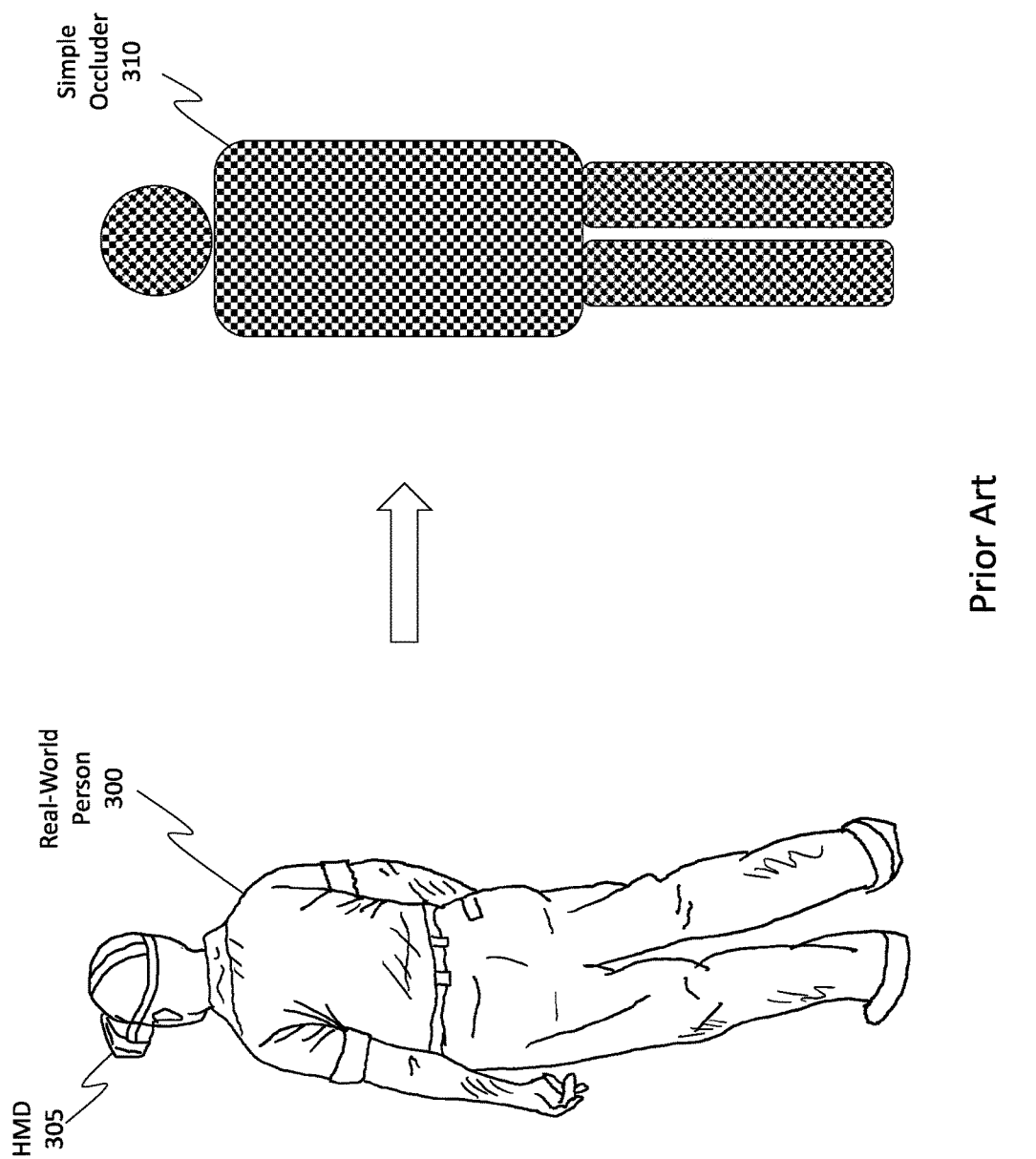
FIG. 3 illustrates how a simple occluder has traditionally been used to block pixels.

Embodiments disclosed herein relate to systems, devices (e.g., hardware storage devices, wearable devices, etc.), and methods for configuring occluders in a MR scene.

In some instances, the disclosed systems and methods are capable of being used to generate and use occluders with reduced computational expense relative to conventional systems and methods for generating and using occluders based on continuous scanning & imaging of objects associated with the occluders.

Some embodiments dynamically select and present an occluder in a MR environment based on assumptions of a user's body. For instance, a relative position of a physical device can be identified. The relative movements and positioning of the device are tracked based on sensor outputs. An assumed understanding of the user's body is determined based on the relative position of the device, thereby enabling an assumption to be made regarding the position of the user's body. A set of occluders are identified and are made available for presentation within the MR environment. These occluders are configured to correspond with the assumed position of the user's body. The embodiments select a particular occluder and then modify the presentation of the MR environment by positioning the occluder in the MR environment to have a size and position corresponding to the assumed position of the user's body.

Some embodiments dynamically update an understanding of a user's body and modify an occluder for the user based on an assumed position of the user's body. For instance, an initial understanding of the user's body position is determined. An occluder based on the assumption is presented within the MR environment. A relative position of a tracked device is identified. The embodiments detect a change in a position or state of the tracked device and then update the understanding of the user's body position. The embodiments also modify the occluder within the MR environment based on the update.

Some embodiments dynamically update a "player collider" based on an understanding of the user's body. For instance, an initial understanding of the user's body position is determined. The player collider is presented within the MR environment. The player collider corresponds with the initial understanding of the user's body and is based on the assumed position of the user's body. An application executing the MR environment (or perhaps in the MR environment) will trigger a MR event when an object in the MR environment and the player collider spatially intersect or collide. A relative position of a tracked device is identified. The embodiments update the understanding of the user's body and corresponding assumption based on the position or state of the tracked device. The embodiments also modify a size or position of the player collider based on the update.

Examples of Technical Benefits, Improvements, and Practical Applications

The following section outlines some example improvements and practical applications provided by the disclosed embodiments. It will be appreciated, however, that these are just examples only and that the embodiments are not limited to only these improvements.

The disclosed embodiments bring about substantial improvements and benefits to the technical field and also provide numerous practical applications. For instance, the embodiments are able to dynamically configure an occluder based on position information obtained without having to perform iterative and costly (in terms of compute and battery usage) scanning operations for generating and/or updating the understanding of the user's body position and corresponding occluder(s) to be used.

Instead, the disclosed embodiments can be used to determine the relative pose (e.g., position and orientation) of an HMD and use that pose information to make an intelligent assumption regarding the current/updated pose of the person. For instance, if the HMD has a particular pose, then the embodiments are able to determine how the person is likely orientated in order to enable the HMD to have that specific pose. If the person is holding or wearing another trackable device, then the pose of that trackable device can also be factored into the assumption calculus. Once the person's body position is assumed, an occluder can be configured to have a size, shape, and orientation corresponding to the person's assumed body position. As a consequence, the disclosed embodiments are able to refrain from performing continuous scans of the environment in order to determine how to structure or configure an occluder.

Even if an initial set of one or more scans/images is used to develop an initial understanding of the user's body position, the current embodiments can be used to make assumptions for updating an understanding of the user's body position without relying on new images/scans of the user's body and by relying, instead, on assumptions based on detected positioning of tracked devices being held/used by the user in the MR environment. By refraining from taking and/or using additional scans of the user's body, while updating the understanding of the user's body position, it is possible to reduce the computational expense associated with generating and using occluders in MR environments relative to conventional systems that rely on imaging of the user's body to update the understanding of the user's body position.

Accordingly, the disclosed embodiments significantly improve the technical field by providing techniques that reduce battery consumption and reduce compute usage. The embodiments also improve the technical field by providing the ability to dynamically and in real-time modify occluders based on changing conditions in the MR scene (e.g., changes in the user's body pose) with reduced computational expense relative to conventional systems.

Configuring Occluders Based on Assumed Body Positions

Instead of scanning an environment in order to determine an object's pose (i.e. location and orientation) based on camera image data, the disclosed embodiments are able to utilize pose information obtained from non-camera sensors in order to determine an object's or person's pose. Examples of non-camera sensors include, but are not limited to, inertial measurement units (IMUs) (including accelerometers, gyroscopes, magnetometers, etc.), global positioning systems (GPS), and others.

For instance, an HMD may be configured to have the non-camera sensors and can use those sensors to determine the HMD's pose. Based on that pose information, the embodiments are able to assume or estimate the pose of the person who is wearing the HMD without scanning the person. Once that assumption is performed, the embodiments are then able to configure an occluder to have a shape and pose corresponding to the person's assumed pose.

Figure 4:
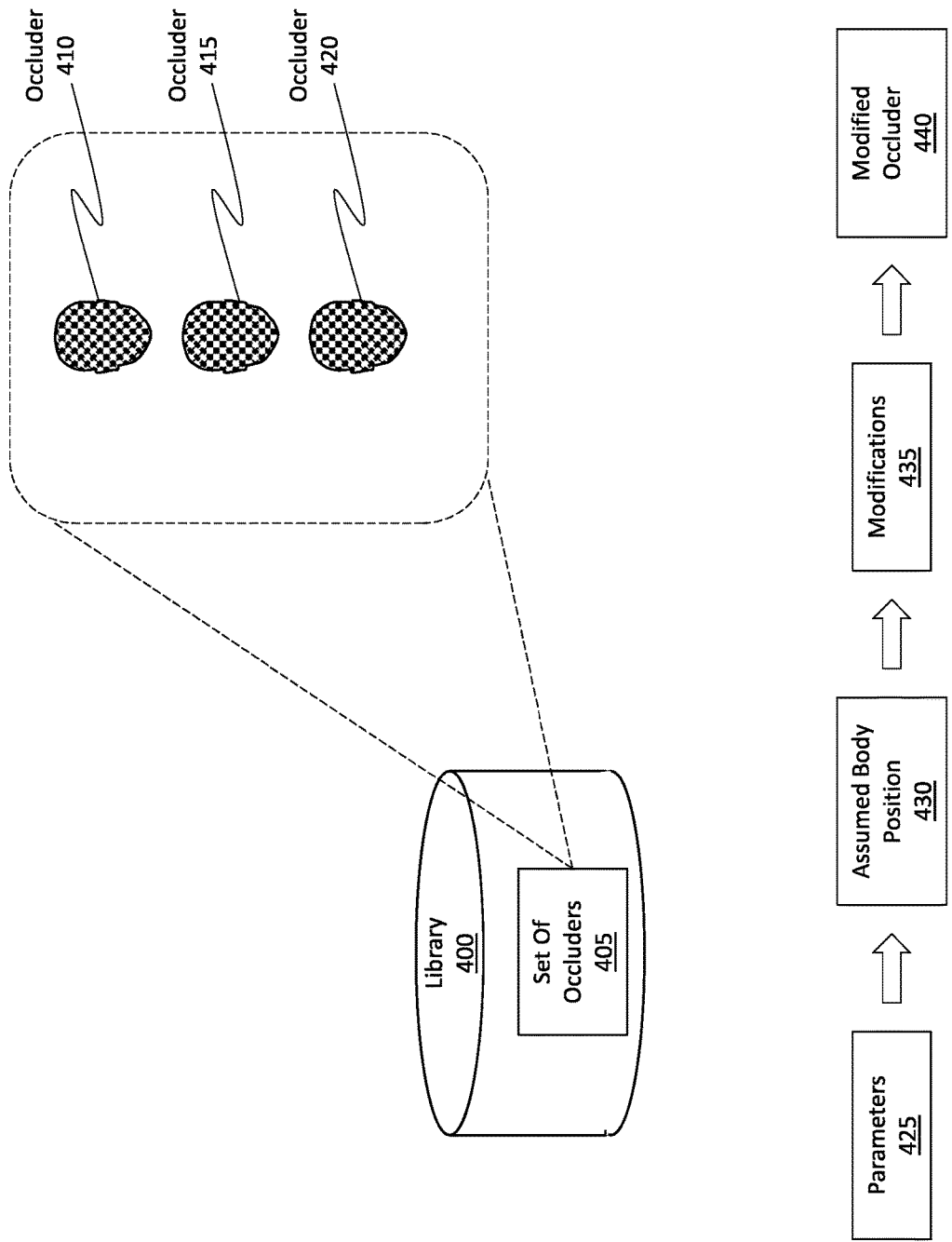
FIG. 4 illustrates how a set of occluders may be generated and how those occluders may be selected and/or modified in order to provide an improved occluder for use in a MR scene.

In some cases, the embodiments generate and configure an occluder while in other cases the embodiments first select an initial pre-generated occluder and then modify or further configure that occluder based on the assumed pose. FIG. 4 is illustrative of some of these processes.

Some embodiments maintain a library 400 comprising a set of occluders 405, such as occluder 410, occluder 415, and occluder 420. Of course, any number of occluders may be included in the set of occluders 405. The set of occluders 405 may be configured to correspond to any number of different human body poses. For instance, one occluder in the set of occluders 405 may be configured to have a pose corresponding to that of a standing male, based on average human male characteristics (e.g., height, weight, shoulder width, torso width, etc.). Another occluder may be configured to have a pose corresponding to that of a standing female, based on average human female characteristics. Another occluder may be configured to have a pose corresponding to a crouching individual or perhaps even a person laying on the ground. Indeed, any number of different poses realized by an occluder. That is, similar to how the occluder 120 from FIG. 1 generally matched or corresponded to the shape and dimensions of the real-world head 100, the set of occluders 405 may have any number of different occluders configured to correspond to any number of shapes and poses.

In some embodiments, the sophistication, complexity, or level of granularity of an occluder may be high and may closely approximate the pose, posture, and features of a person. In some embodiments, the complexity or level of granularity may be lower such that the shape of the occluder abstractly mimics the shape of a person. For instance, a basic occluder may have a basic circle or sphere for a person's head and a basic cylinder or rectangle for the person's torso. The arms and legs may also be formed using basic shapes.

In more granular or more complex occluders, the arms, legs, head, and torso of the occluder may be designed to closely approximate a person's actual arms, legs, head, and torso. It may be the case that an initial calibration operation is performed where the HMD performs a scan of the person's body in an attempt to identify the physical features of the person. Based on that initial calibration, some embodiments then design a highly detailed and intricate occluder designed to mimic the detected features of the person.

FIG. 4 illustrates a simplified flowchart of some of the disclosed principles. FIG. 4 introduces these concepts at a high level while the remaining figures provide further details and clarification.

The disclosed embodiments initially identify a set of parameters 425, such as the pose of the HMD being worn by a person. A detailed discussion on parameters will be provided later. Based on the parameters 425, the embodiments then perform an estimation in order to determine or assume the person's body pose, as shown by assumed body position 430. Based on the person's assumed body position, the embodiments then configure an occluder to have a shape and configuration matching the assumed body pose.

Figure 5:
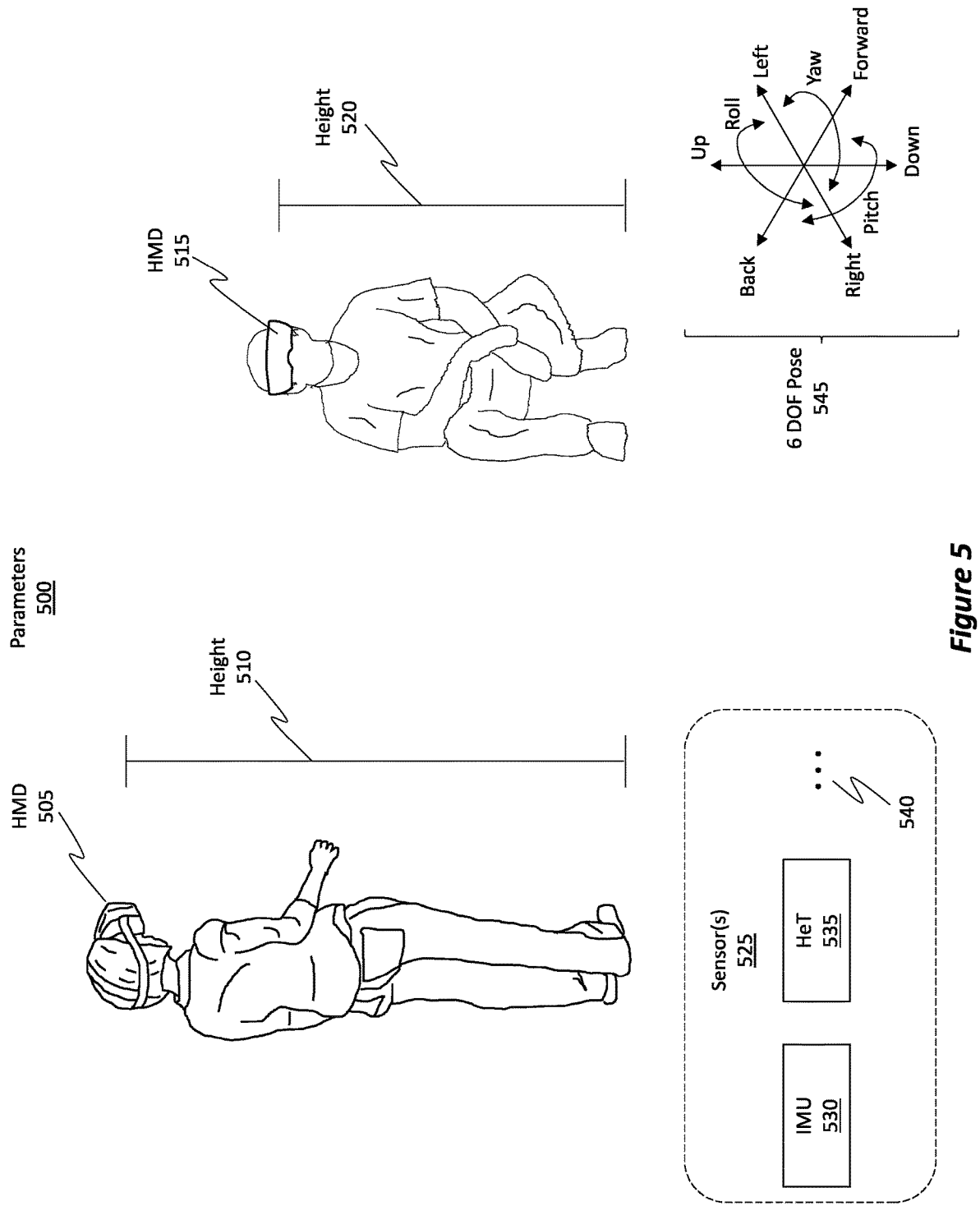
FIG. 5 illustrates how an occluder may be modified and/or selected based on different parameters.
Figure 6:
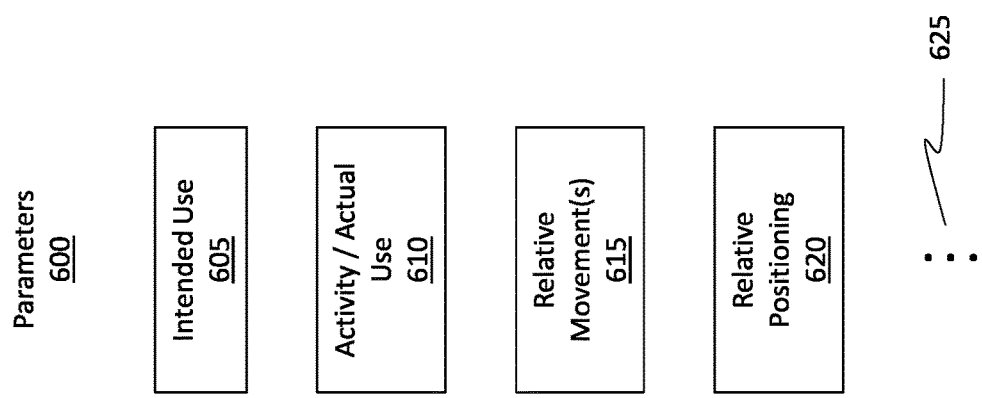
FIG. 6 illustrates some additional parameters that may be used to modify and/or select an occluder.

In some instances, the embodiments generate from scratch an entirely new occluder while in other instances the embodiments select a pre-generated occluder and then potentially modify that occluder to match the assumed body pose. The box labeled modifications 435 is symbolic of either one or both of those two operations. As a result of performing the modifications 435, the embodiments produce a modified occluder 440 having a specific configuration (e.g., shape, orientation, and pose matching that of the assumed body position). FIGS. 5 and 6 provide some additional details regarding some of the parameters 425.

FIG. 5 shows parameters 500, which are representative of the parameters 425 from FIG. 4. In particular, FIG. 5 shows an HMD 505 that is currently positioned at a height 510. Similarly, FIG. 5 shows a different HMD 515 that is currently positioned at a height 520.

Using sensor(s) 525 included in the HMDs 505 and 515, the embodiments are able to not only determine the heights 510 and 520 but other pose-related information as well. In some cases, the sensor(s) 525 include, but are not limited to, an IMU 530 and a head tracking HeT camera 535. The ellipsis 540 demonstrates how other sensors (e.g., GPS, etc.) may be used as well. While this disclosure previously stated that non-camera sensors may be used, it should be noted that the disclosed embodiments are not prevented from using camera sensors as well, such as the HeT camera 535. For instance, the disclosed embodiments are able to periodically rely on camera image data in order to ensure that the non-camera sensors are still in sync with the camera imagery. Accordingly, camera images may be used to supplement, augment, or perhaps synchronize the data from the non-camera sensors. Further details of this aspect will be provided later.

In any event, the embodiments are able to determine the HMD 505 and 515's 6 degree of freedom (6 DOF) pose 545, which includes translation information (e.g., back/forward, left/right, and up/down) and angular information (e.g., yaw, pitch, and roll). Based on the 6 DOF pose 545, an estimation or assumption can be made regarding the person's own body position or pose. For instance, in order to have the HMD 505 be at the illustrated location, the embodiments assume the woman is standing. Similarly, in order to have the HMD 515 be at the illustrated location, the embodiments assume the man is crouching.

More specifically, in FIG. 5, the HMD 505 on the woman appears to be tilted slightly upward while the woman is standing. Because the HMD 505 has determined the height 510 and because the HMD 505 has determined the orientation or angular pose of itself, the HMD 505 is able to assume that the woman is in a standing pose with her head slightly tilted upward.

Similarly, the HMD 515 on the man appears to be faced straightforward while the man is crouching. Because the HMD 515 has determined the height 520 and because the HMD 515 has determined the orientation or angular pose of itself, the HMD 515 is able to assume that the man is in a crouching pose with his head relatively straight.

FIG. 6 lists some additional parameters 600 that may be included among the parameters 425 of FIG. 4, and which parameters are used to assume a person's body position. Specifically, parameters 600 include an intended use 605 parameter, an activity/actual use 610 parameter, a relative movement(s) 615 parameter, and a relative positioning 620 parameter. The ellipsis 625 illustrates how other parameters may be considered as well.

The intended use 605 parameter generally refers to an activity that the person appears to be engaged in or is planning on being engaged in. For instance, if the HMD detects that the person is holding a golf club, then the HMD can estimate or predict that the person is about to play a round of golf. Based on that assumption, the HMD can proceed with configuring a number of occluders that are generally shaped to correspond to a person's pose while playing golf. One example pose would be the backswing of the person. The embodiments are able to configure an occluder to have a pose corresponding to the backswing pose. Of course, that is only one example, and the broader principles should be applied. In this regard, the embodiments are able to detect, determine, or estimate an intended use 605 regarding how the HMD will be used and then configure occluders based on that intended use 605.

The activity/actual use 610 parameter refers to an activity that is currently being performed by the person wearing the HMD. Any activity may be detected, such as perhaps cooking a dinner or sitting on a couch or lying in a bed. Based on the detected activity, the embodiments are also able to configure occluders.

The relative movement(s) 615 refers to detected movements of the HMD and person. Perhaps a specific activity is not currently known by the HMD. Despite the possibility of not detecting which specific activity the person and HMD are currently engaged in, the embodiments are still able to track the relative movement(s) 615 of the HMD and person in order to estimate or assume the person's body position. Similarly, the embodiments are able to detect the relative positioning 620 of the person in order to configure occluders.

Figure 7:
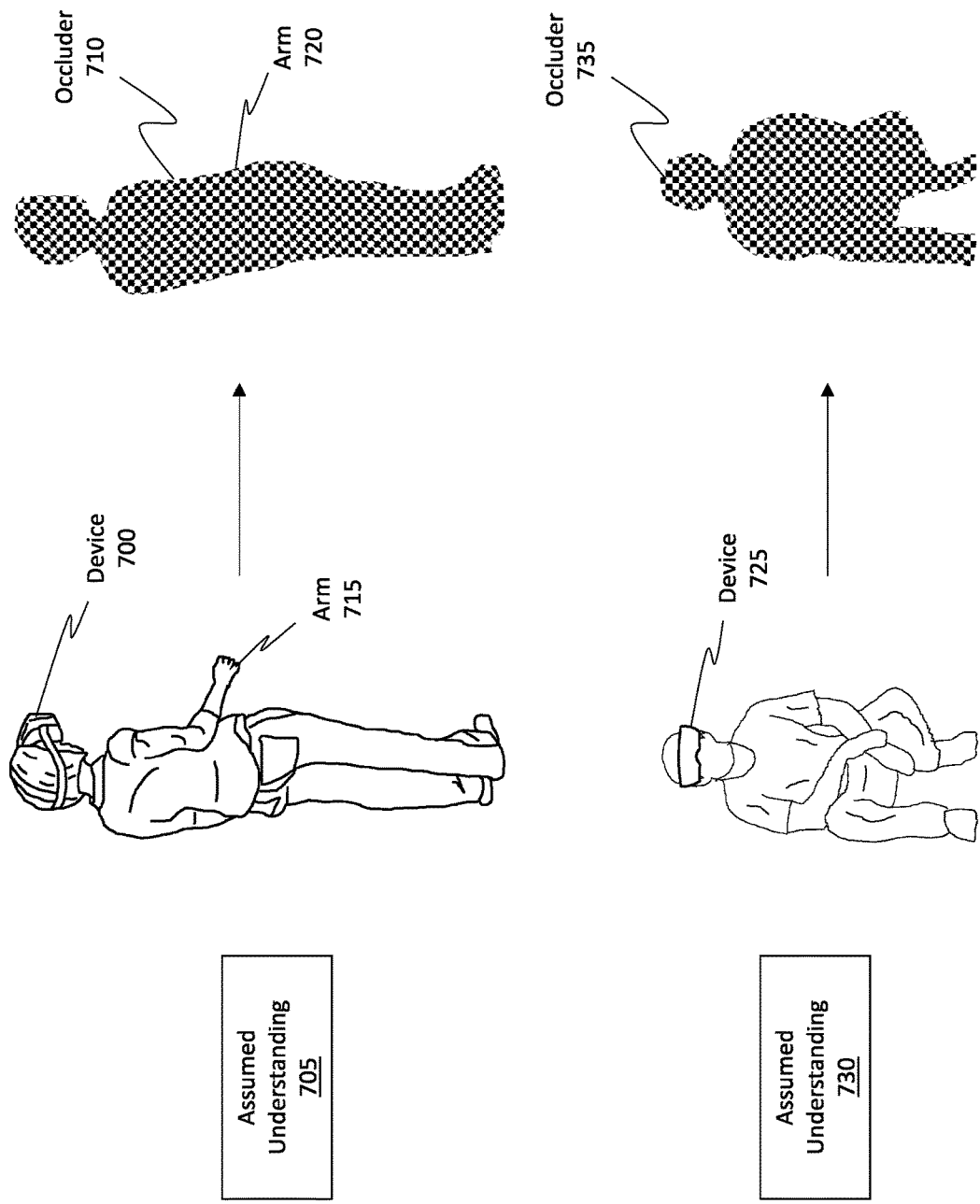
FIG. 7 illustrates how an occluder may be generated, modified, or selected based on the detected relative position, orientation, or intended use of an HMD.

FIG. 7 illustrates various different examples of actual occluders and how those occluders may be configured based on a person's assumed body position. FIG. 7 shows a device 700, which is representative of any of the HMDs discussed thus far. Based on the detected or determined parameters of the device 700, the embodiments are able to generate an assumed understanding 705 regarding the person's body pose or position. Based on the assumed understanding 705, the embodiments are able to configure an occluder to have characteristics matching the assumed pose of the person wearing the device 700, as shown by the occluder 710.

Notice, the occluder 710 has a shape, form, and orientation generally matching the shape, form, and orientation of the person wearing the device 700. Furthermore, this occluder 710 was generated without relying on camera imagery obtained from a scan; rather, the occluder 710 was configured based on an assumed body position of the person, where the assumption is based on the detected pose (i.e. location and orientation) of the device 700. In the context of device 700, the assumed understanding 705 of the user's body comprises (in this case) a determination that the user is standing. That determination may further include a determination regarding how tall the user is, what posture or pose the user has, and so forth.

Because the embodiments do not necessarily rely on camera imagery, there may be a few slight discrepancies between the pose of the occluder 710 and the pose of the person. For instance, notice the woman's arm 715 is slightly forward relative to her body. The occluder 710, on the other hand, has the arm 720 near the torso such that there is a slight discrepancy between the pose of the occluder 710 and the pose of the woman. The disclosed embodiments are enabled to address this issue in a number of ways, including (i) periodically using camera imagery to ensure alignment and/or (ii) relying on pose information from a tracked object that is either being held or worn/carried by the person. These aspects will be discussed in more detail later. Additional operations may also be used/performed to further mitigate and/or reduce the possibility of discrepancies between the pose of the occluder 710 and the pose of the actual person wearing the device 700.

FIG. 7 shows another device 725 being worn by a person. Similar to the discussion regarding device 700, the embodiments are able to generate an assumed understanding 730 of the person's pose based on parameters detected with regard to the pose of the device 725. Based on the assumed understanding 730, the embodiments can then generate an occluder 735 having a pose that is assumed to match or coincide with the assumed pose of the person wearing the device 725.

In the context of device 725, the assumed understanding 730 of the user's body comprises a determination that the user is crouching (or, in other scenarios, perhaps laying down or any other position). In some cases, that determination may further include a determination of a relative direction the user is crouching or laying within the MR environment.

Accordingly, the embodiments are able to obtain sensor data detailing the pose of an HMD and/or another device. Using that sensor data, the embodiments determine the HMD's pose and then make an assumption regarding how the person wearing the HMD is likely positioned in order to have the HMD be in its pose. After estimating or assuming the person's pose, the embodiments then configure an occluder to have characteristics or features matching that assumed body pose. By performing these operations, the embodiments are able to refrain from constantly having to scan the environment to generate occluders.

Configuring Occluders Based on Pose Information from Multiple Devices

In an effort to avoid the scenario shown in FIG. 7 where the arm 720 portion of the occluder 710 does not mimic the arm 715 of the person wearing the device 700, some embodiments are configured to track and monitor a second device that is associated with the person wearing the HMD. Such a scenario is shown in FIG. 8.

Figure 8:
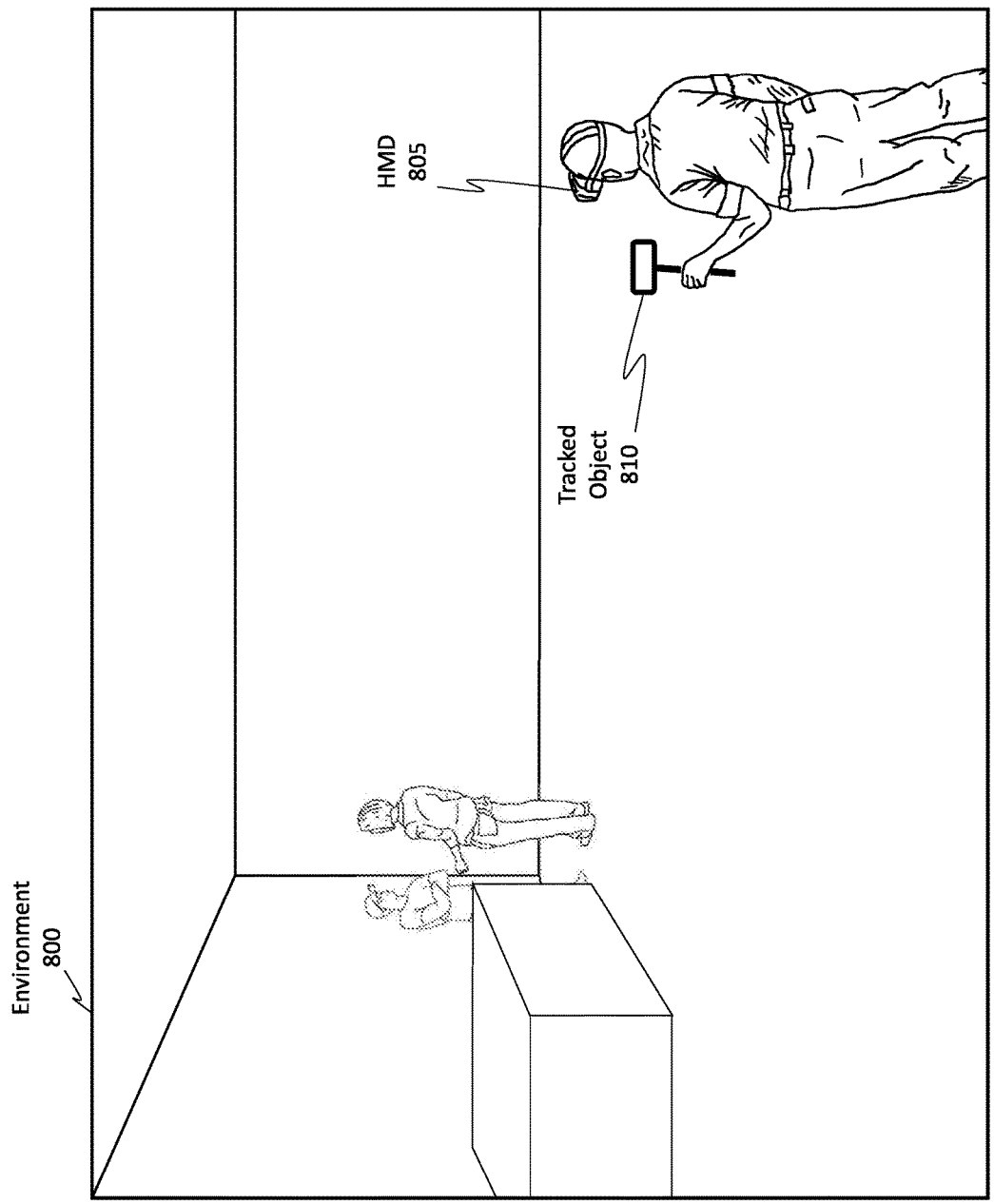
FIG. 8 illustrates an example scenario in which an HMD is being used in conjunction with another tracked object (e.g., a handheld device).

FIG. 8 illustrates an example environment 800 in which an HMD 805 is operating. HMD 805 is representative of the HMDs discussed thus far in that the HMD 805 is able to acquire sensor information in order to determine a pose of the HMD 805 and then use that pose to predict, estimate, or assume a pose of the person wearing the HMD 805. As discussed previously, it is beneficial to track an additional device on the person in order to improve the assumption regarding the person's body position. As such, FIG. 8 shows an example scenario in which the person wearing the HMD 805 is also holding (or perhaps wearing) a tracked object 810.

Tracked object 810 may be any type of object or device that is capable of being tracked by the HMD 805 and/or capable of performing its own tracking. For instance, suppose the tracked object 810 is a non-electronic device. In some cases, therefore, the HMD 805 may use its HeT cameras or other cameras to record the position of the tracked object 810 in order to improve the resulting body position assumption.

In other scenarios, the tracked object 810 is a smart device capable of using its own sensor data to determine its pose. For instance, similar to how the HMD 805 may include IMUs, a GPS, and other sensors, the tracked object 810 may also include similar types of sensors. By way of example and not limitation, the tracked object 810 may be a smart phone, tablet, laptop, Internet-of-Things (IoT) device, or some other so-called "smart" device.

Figure 9:
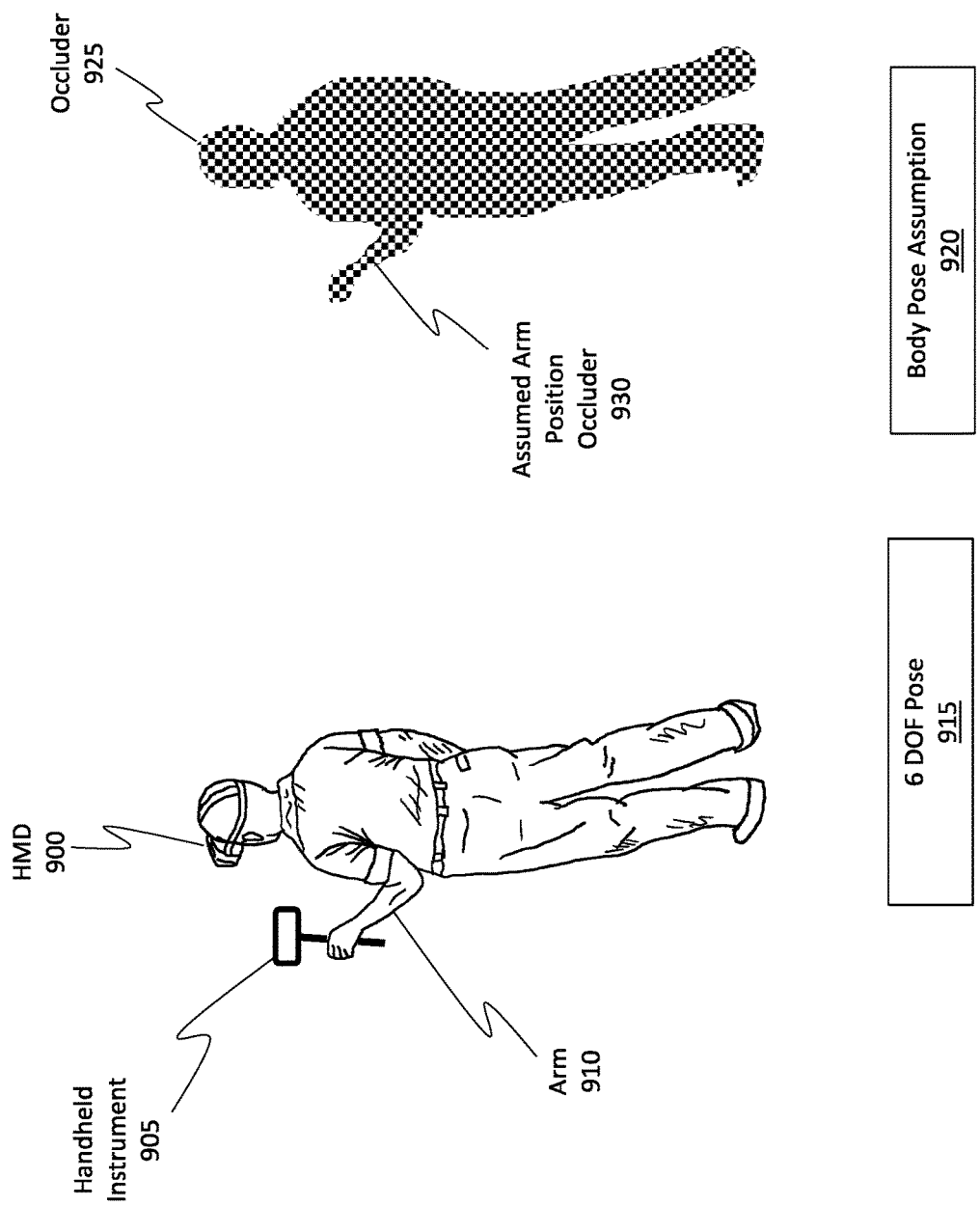
FIG. 9 illustrates how an occluder can be generated, modified, or selected based on a combination of pose information obtained for both the HMD and the handheld device/instrument, where the resulting occluder is configured based on an assumed pose that is determined from position information associated with the handheld instrument.

The HMD 805 and the tracked object 810 are able to communicate over a wireless connection (e.g., NFC, Bluetooth, wideband radio connection, etc.) or perhaps even a wired connection. The tracked object 810 is able to use this connection to transmit its pose information to the HMD 805. Based on the received pose information from the tracked object 810, the HMD 805 is able to then identify where the tracked object 810 is located in relation to the HMD 805. Based on that relative location and how the tracked object 810 is oriented, the HMD 805 is able to generate an assumption regarding how the person wearing the HMD 805 is likely positioned in order to cause the tracked object 810 to have the determined orientation and placement location and in order to cause the HMD 805 to have the determined orientation and placement location. FIG. 9 is illustrative of these concepts.

FIG. 9 shows an HMD 900, which is representative of the HMD 805 from FIG. 8, and a handheld instrument 905, which is representative of the tracked object 810 from FIG. 8. As shown, the person wearing the HMD 900 has his arm 910 angled in order to hold the handheld instrument 905 at the indicated orientation and location (i.e. pose).

In accordance with the disclosed principles, the handheld instrument 905 is able to determine its 6 DOF pose 915 and then transmit this pose information to the HMD 900. The HMD 900 is also able to determine its 6 DOF pose. The combination of these two pieces of information enables the HMD 900 to determine the relative position of the handheld instrument 905 relative to the HMD 900. Based on that relative position, the HMD 900 is then able to generate an assumption or an estimate regarding how the person is likely to be positioned (e.g., body pose assumption 920) to enable both the HMD 900 to be at its specific pose and the handheld instrument 905 to be at its specific pose. Based on the assumed body position, the embodiments are then able to generate a corresponding occluder that is configured to match or coincide with the positional arrangement of the person, or rather the person's assumed body position.

FIG. 9 shows the resulting occluder in the form of occluder 925. Notice, the shape, size, and orientation of the occluder 925 is configured in an effort to match the shape, size, and orientation of the person wearing the HMD 900, based on the body pose assumption 920. Furthermore, because the HMD 900 was able to utilize the pose information from the handheld instrument 905, the embodiments were able to improve or further refine the occluder 925 to have a higher degree of correlation, specifically with regard to the arm 910. Here, the assumed arm position occluder 930 is configured in a manner to correspond to the position and angling of the arm 910. This modification to the occluder 925 is performed as a result of obtaining the 6 DOF pose 915 from the handheld instrument 905 and as a result of generating an assumption regarding how the arm 910 is likely to be positioned in order to achieve the 6 DOF pose 915.

In some embodiments, the assumed understanding of the user's body (e.g., the body pose assumption 920) is based on the relative position of a first physical device (e.g., the HMD 900 or the handheld instrument 905) in a MR environment in combination with a determined relative position of a second physical device (e.g., the other one of the HMD 900 or the handheld instrument 905) in the MR environment.

In some embodiments, the resulting occluder (e.g., occluder 925) may be generated from multiple constituent subparts or sub-occluders that are grouped or fused together to form the overall occluder. Consequently, some embodiments perform an occluder assembly 1000, as shown in FIG. 10.

Figure 10:
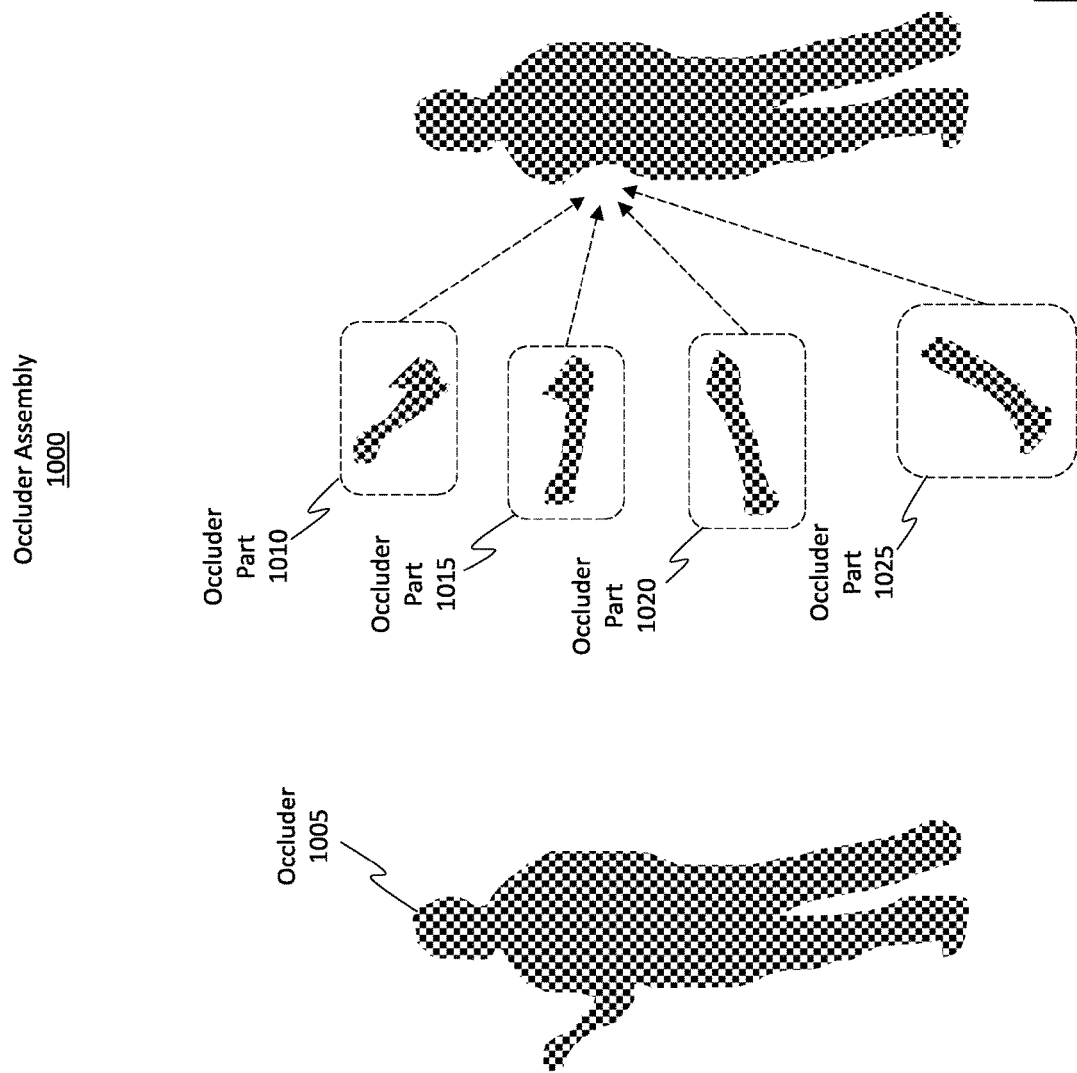
FIG. 10 illustrates how an occluder may be generated or assembled from any number of sub-portions or sub-occluders.

FIG. 10 shows the occluder 1005, which is representative of the occluder 925 from FIG. 9. In some embodiments, an initial base occluder is generated based on the pose information of the HMD. For instance, if the pose information of the HMD indicates the person wearing the HMD is likely standing, then an initial standing pose occluder may be selected. That initial occluder may then be subsequently modified based on the pose information of the handheld instrument.

For instance, the library 400 of FIG. 4 may include any number of occluder parts that may be mixed and matched with other occluder parts in order to form the final occluder. By way of example, the occluder part 1010, occluder part 1015, occluder part 1020, and occluder part 1025 may all be stored in the library 400.

In some implementations, the embodiments analyze the available occluder parts and select one that will result in the highest degree or level of correspondence 1030 in order to match the pose of the handheld instrument. For instance, the occluder part 1025 is shown as being an arm in the downward position, so it is unlikely that the person's arm would be in that pose because that pose would not enable the handheld instrument to assume the 6 DOF pose illustrated in FIG. 9. Similarly, the occluder parts 1020 and 1015 are also unlikely to enable the handheld instrument to assume the illustrated pose.

The occluder part 1010, on the other hand, would provide the highest correspondence 1030 or confidence in achieving the pose of the handheld instrument in FIG. 9. Consequently, the embodiments are able to select the occluder part 1010 and affix or fuse it to any other occluder parts in order to form the resulting occluder 1005. In some cases, the selected occluder part may still not perfectly or sufficiently align with the actual pose of the handheld instrument (e.g., a threshold requirement may not be met). In such cases, the embodiments are able to modify the selected occluder part in an effort to better align it with the assumed body position.

While FIG. 10 illustrated a scenario involving an "arm" occluder part, one will appreciate how an occluder part may correspond to any body part. For instance, there may be occluder parts for heads, arms, torsos, legs, feet, and so forth, without limit. These different body part occluders may be for different genders, weight specifications, height specifications, orientations, poses, and so forth.

In some cases, instead of selecting pre-generated occluders and then modifying and/or fusing them, some embodiments build or generate occluders from scratch based on the pose information of the HMD and the handheld instrument. As such, the principles described herein should be interpreted broadly.

Figure 11:
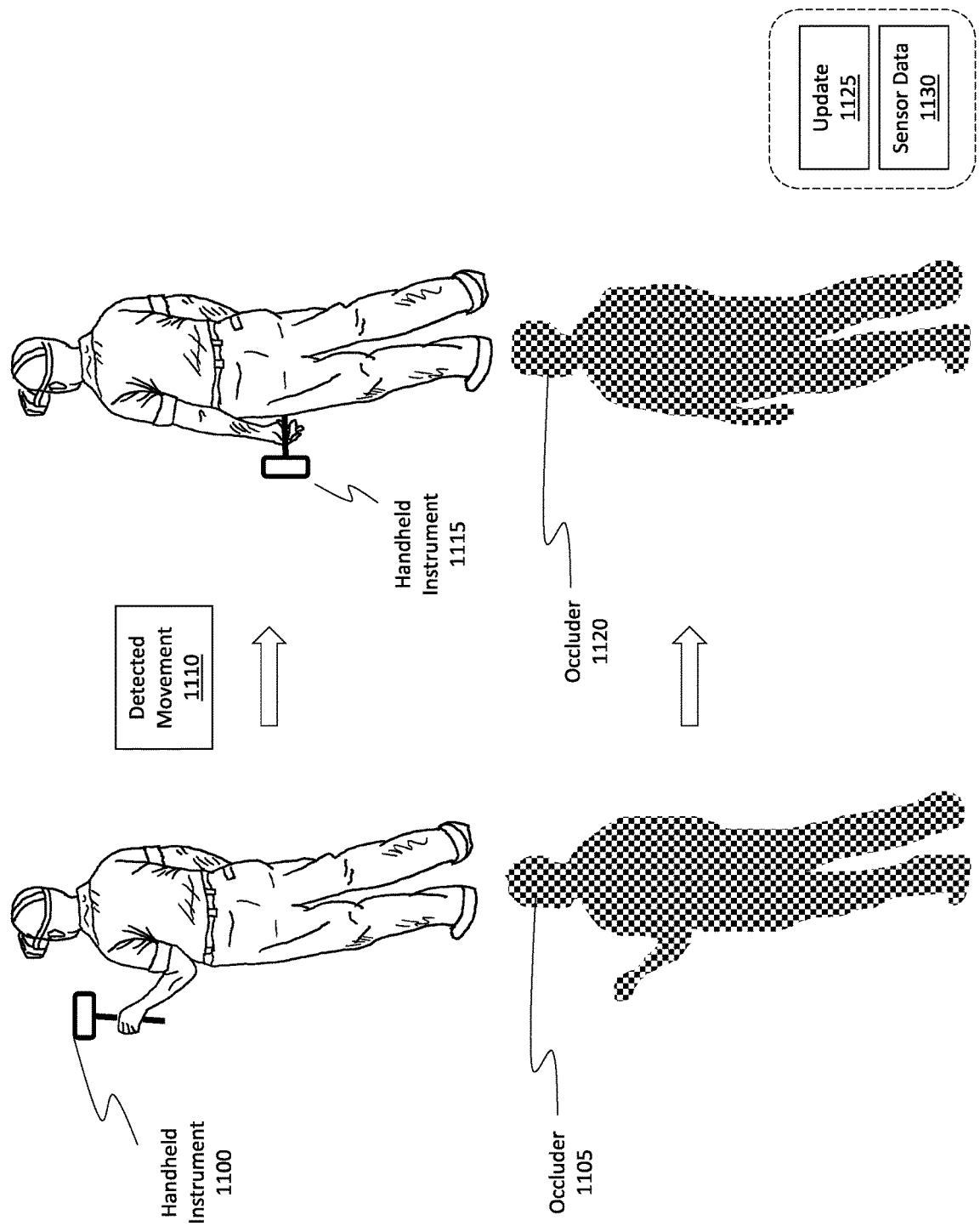
FIG. 11 illustrates how detected movement of a handheld instrument can trigger modification to the occluder.

It is typically the case that people in a MR scene are not stationary. As such, the embodiments are able to dynamically and in real-time adjust the occluders based on the detected movements of the person. FIG. 11 is illustrative.

FIG. 11 shows an example scenario in which a handheld instrument 1100, which is representative of the handheld instrument 905 of FIG. 9, is being held by a person wearing an HMD. Based on this current pose, the embodiments have generated or configured a corresponding occluder 1105. Subsequently, there is a detected movement 1110 of the handheld instrument such that it is now at the position shown by handheld instrument 1115. The embodiments are able to collect pose information from the handheld instrument 1100 in order to determine when, how, and where the handheld instrument 1100 is moving. Based on that pose information, the embodiments can then generate an assumption regarding the new position of the person holding the handheld instrument. New assumptions and new occluders may be generated even while the movement is occurring.

In response, the embodiments can then generate a new occluder 1120 based on the updated pose. Notice, the arm holding the handheld instrument in the occluder 1120 is now in a relaxed position to correspond to the new position of the handheld instrument 1115. Accordingly, the embodiments are able to dynamically modify or configure occluders based not only on detected movements of an HMD but also based on detected movements of a handheld instrument.

Some embodiments periodically or on a triggered basis perform an update 1125 to the understanding or assumption of the person's body position using the HMD's cameras in order to obtain camera-based sensor data 1130. That is, some embodiments operate in an effort to maintain synchronization between the person's actual pose and the pose represented by an occluder by periodically using camera imagery to ensure alignment.

Figure 12:
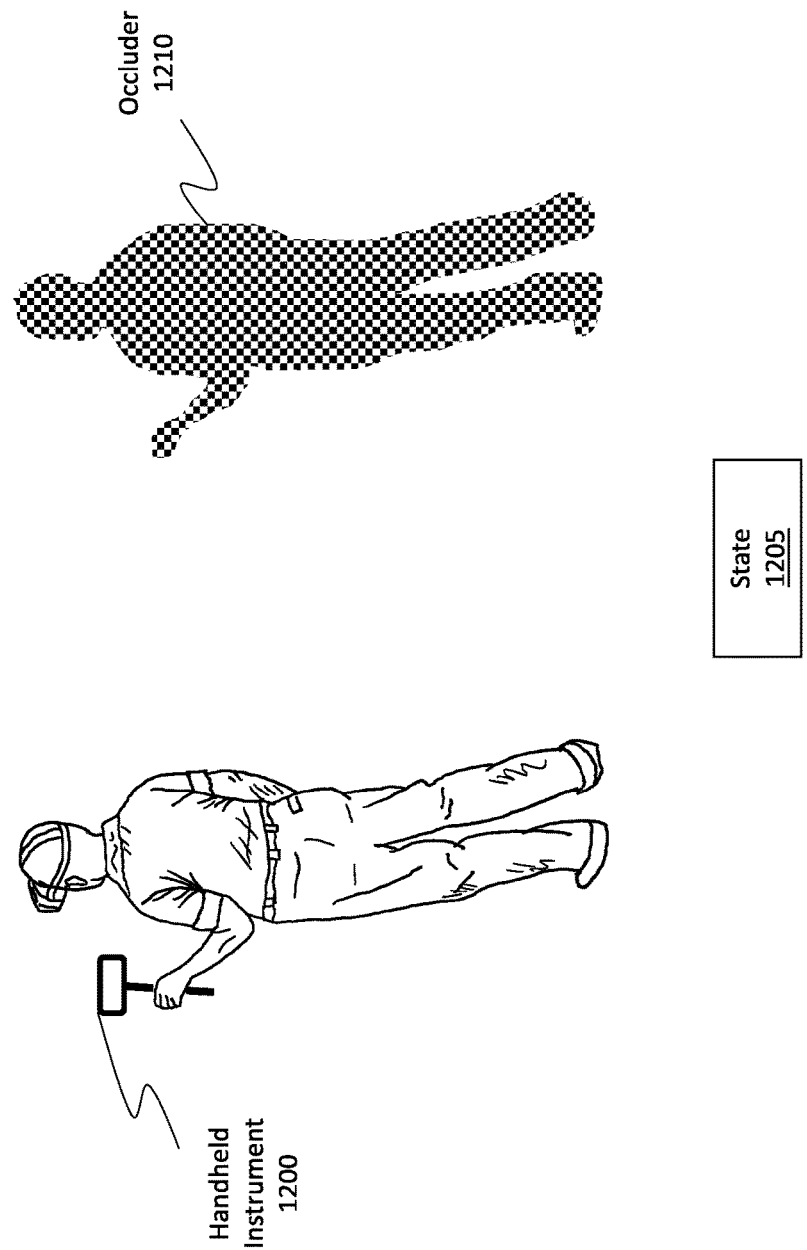
FIG. 12 illustrates how the state of a handheld instrument can trigger modification to the occluder.

In some implementations, the occluder may be configured based on a current state of the handheld instrument. FIG. 12 is illustrative of this concept. FIG. 12 shows a handheld instrument 1200, which is representative of the handheld instruments discussed thus far. In some cases, the embodiments are able to determine a state 1205 of the handheld instrument 1200 and then configure an occluder based on the state 1205, as shown by the occluder 1210.

By way of example, suppose the handheld instrument 1200 was an arrow and the person wearing the HMD was also wearing a quiver. If the state 1205 of the arrow was that of the arrow being out of the quiver, then the embodiments can infer or predict an intended use of the arrow and configure the occluder 1210 to have a shape and configuration based on the likelihood that the arrow will be strung on a bow string and used in that manner. On the other hand, if the state 1205 of the arrow was that of the arrow being inside of the quiver, then the embodiments can infer that the arrow is likely not to be used and can then refrain from continuing to collect pose information for that arrow, at least for a period of time. If the state 1205 changes, then the data collection process may resume.

As another example, suppose the handheld instrument 1200 was a golf club. If the state 1205 of the golf club was that of the golf club being held in the person's hands, then the embodiments can infer that the golf club is about to be used in accordance with conventional golf club usage techniques. The embodiments can then configure the occluder 1210 based on the state 1205 of the golf club. Relatedly, if the golf club, which is being tracked, is not being used in accordance with club usage techniques (e.g., perhaps it is placed in a golf bag), then the embodiments can identify that state of the club and configure the occluder 1210 accordingly.

Yet another example could be that of an active or inactive state of the handheld instrument 1200. For instance, the active state may be a powered on state or perhaps a demonstrated usage of the handheld instrument 1200. On the other hand, the inactive state may be a powered off state or a non-use of the handheld instrument 1200. Any detectable state may be relied on in order to configure the occluder 1210.

Accordingly, in some embodiments, the assumed understanding of the user's body is based on the relative position of a physical device (e.g., an HMD or handheld device) in combination with a determined state of intended use or actual use of the physical device in the MR environment. Of course, multiple parameters or factors may be concurrently considered when generating the assumption of the person's body position. In some cases, the assumed understanding of the user's body within the MR environment includes determining an assumed position of an arm, leg, torso, or other body part of the user based on the determined state of the handheld instrument within the MR environment. In some cases, the embodiments detect a change in the determined state of the handheld instrument within the MR environment and then modify at least one of a selection of an occluder or a shape or position of the occluder based on the detected change in the determined state of the handheld instrument. Such operations may be performed irrespective of any change in relative positioning of the handheld instrument within the MR environment.

Sharing Occluders with Other HMDs

Often, HMDs are used in a multi-user scenario. It is beneficial to be able to share an occluder generated by one HMD with any other HMDs located in the same environment.

Figure 13:
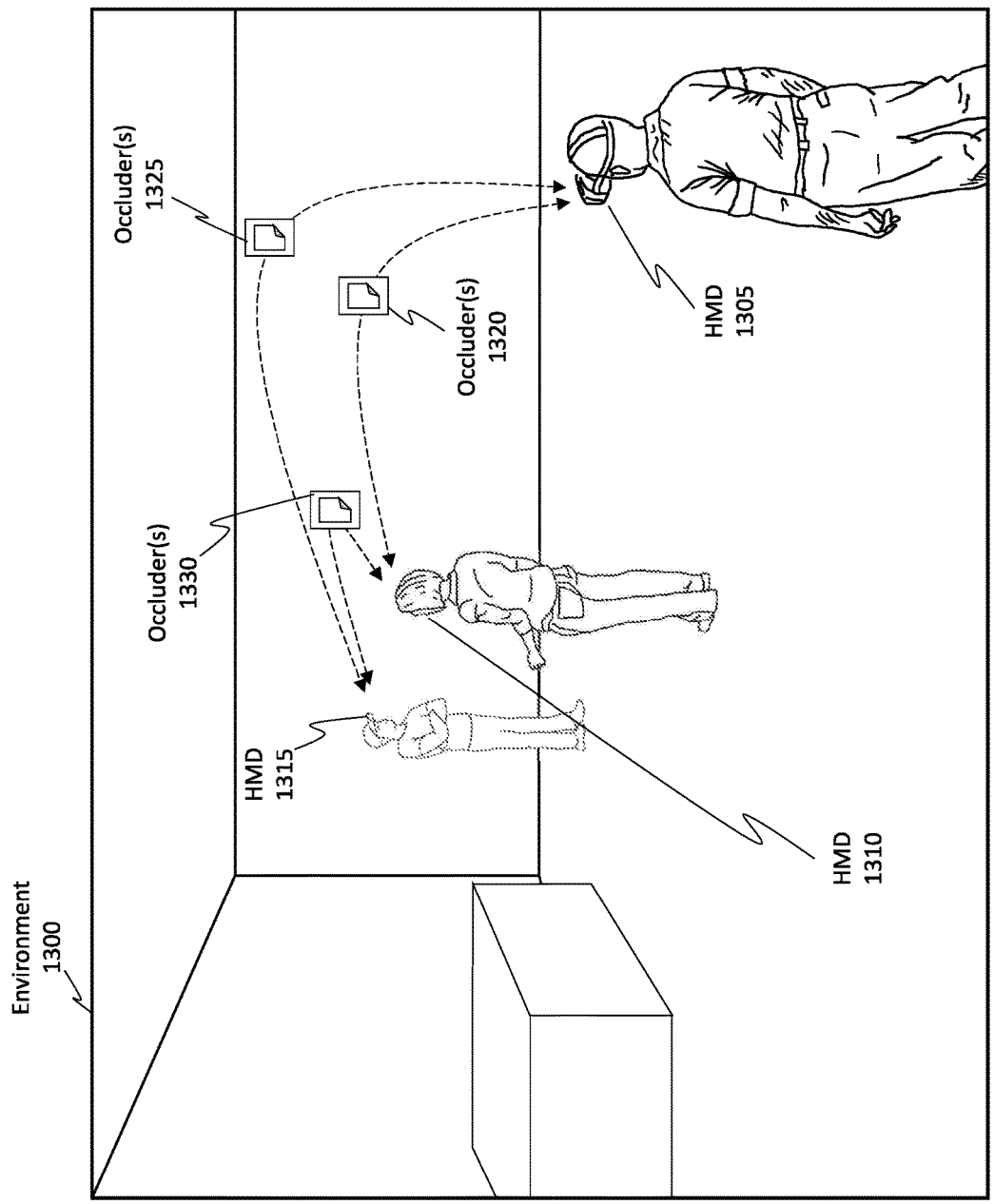
FIG. 13 illustrates how occluders can be shared amongst other HMDs in a multi-user scenario.

FIG. 13 shows an environment 1300 in which multiple HMDs are present, as shown by HMD 1305, HMD 1310, and HMD 1315. Each of these HMDs may be configured in the manner described earlier in that each is able to generate its own respective occluder based on pose information of the HMD and/or pose information of a handheld instrument or other tracked instrument on the person's body. As recited above, it is often beneficial to share this occluder information with other HMDs so they can benefit by using that occluder instead of performing a scan of the room.

As an initial matter, in some cases, the HMDs may individually or collectively perform an initial scan of the environment 1300 to determine properties of the environment 1300 and to generate a spatial mapping or awareness of the environment 1300. Once that initial scan is performed, the embodiments can refrain from performing a continuous scan and instead can rely on the principles taught herein to generate occluders and to place holograms in the MR scene. If the scanning has stopped, then one HMD might not know the current position of another HMD. As such, it is beneficial to share the occluders between the different HMDs in order to enable each HMD to have data detailing the pose of the person wearing each HMD and in order to enable each HMD to place holograms at realistic locations using the occluders. Further details on this aspect will be provided later.

In FIG. 13, the HMD 1305 is communicating with the HMD 1310 and those two HMDs are passing back and forth occluder(s) 1320. To clarify, occluders for the person wearing the HMD 1305 are being transmitted to the HMD 1310, and occluders for the person wearing the HMD 1310 are being transmitted to the HMD 1305. Similarly, HMD 1305 and HMD 1315 are transmitting occluder(s) 1325 back and forth, such that HMD 1305 has occluder information for the person wearing HMD 1315 and HMD 1315 has occluder information for the person wearing HMD 1305. To complete the example, HMD 1315 and HMD 1310 are transmitting occluder(s) 1330 back and forth, such that HMD 1310 has occluder information for the person wearing HMD 1315 and HMD 1315 has occluder information for the person wearing HMD 1310. Any type of wireless connection may be used to facilitate these communications.

In this regard, the different HMDs are able to communicate with one another to deliver or transmit occluder information to one another. In doing so, the HMDs are able to have live and up-to-date occluders for the various different HMDs in the environment 1300, and each HMD is able to use those occluders to interact with their respective depth buffers in order to place holograms in the MR scene.

Figure 14:
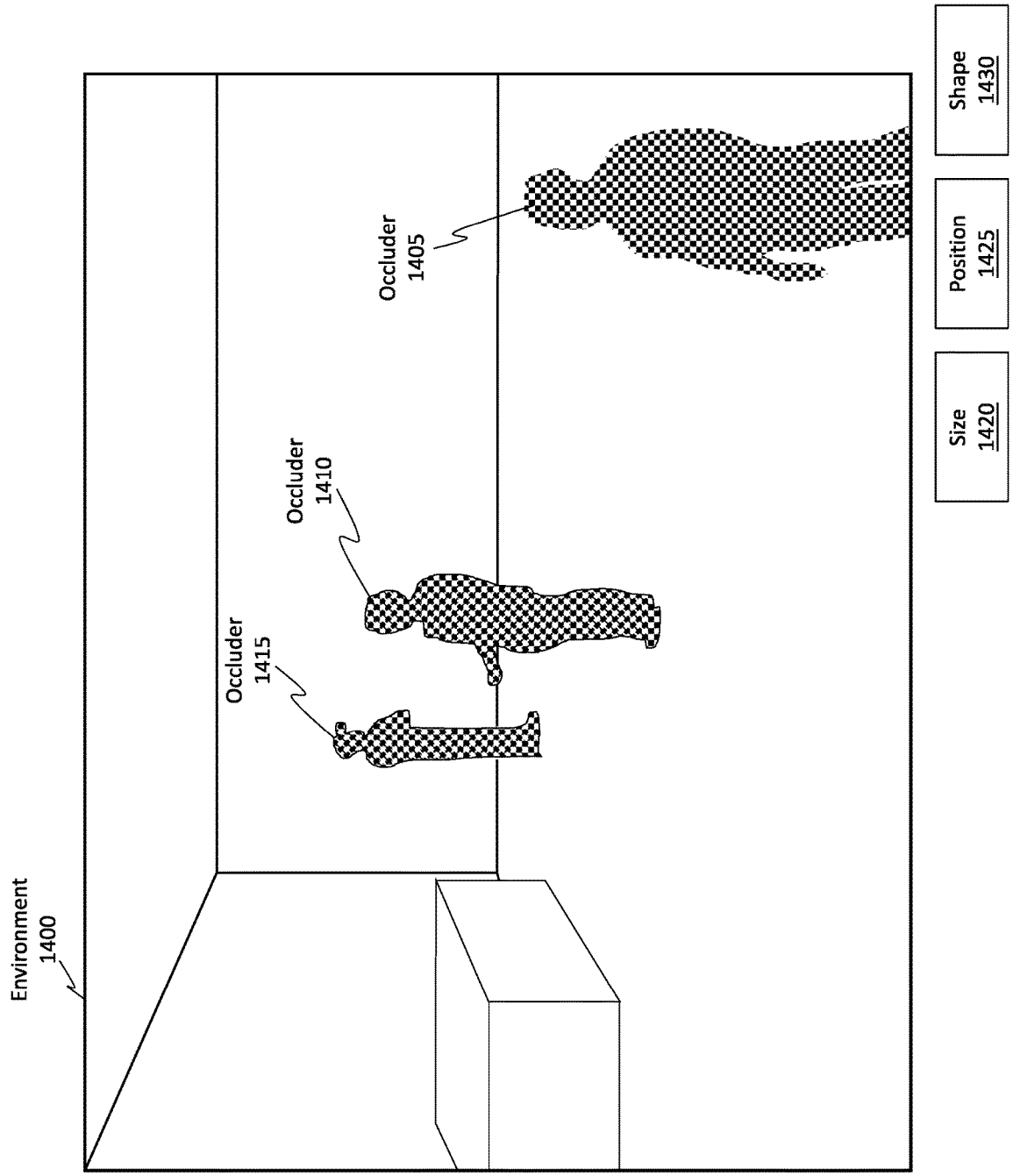
FIG. 14 illustrates how each HMD is able to maintain information regarding the occluders of other persons or objects in the MR scene.

FIG. 14 shows an environment 1400, which is representative of the environment 1300 of FIG. 13. Now, each HMD has occluder information for the other HMDs in the environment 1400. For instance, each HMD is aware or has information reflective of occluder 1405, occluder 1410, and occluder 1415. The size 1420, position 1425, and shape 1430 of each occluder are also known by each HMD. Furthermore, as the occluders are updated or further configured based on movements of the HMD and other trackable objects, each HMD receives the updated information in order to maintain an up to date occluder for each respective HMD.

Occluders Influence in MR Scenes

Figure 15:
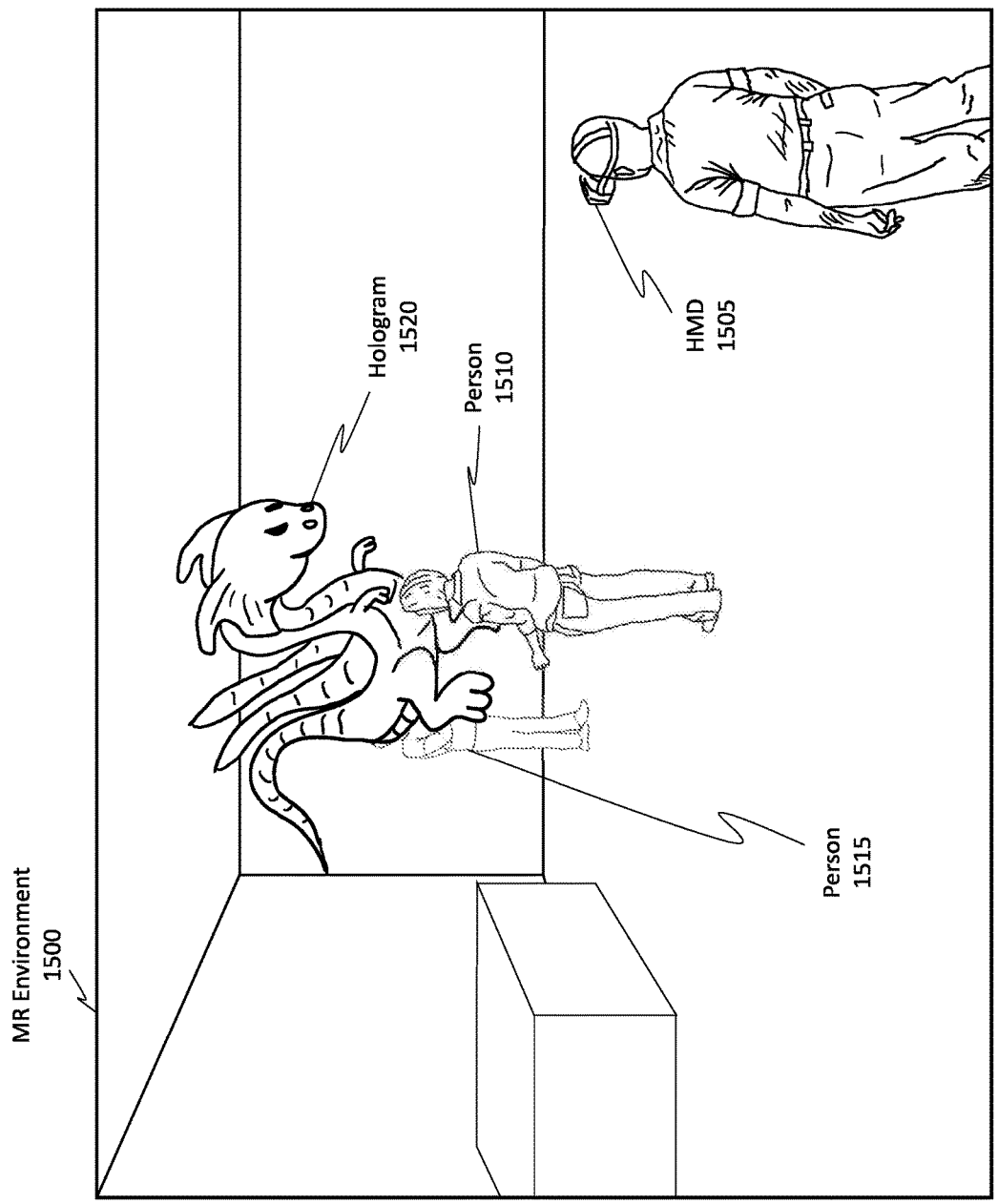
FIG. 15 illustrates an example MR scene in which a hologram is being displayed and in which the hologram is being occluded by different occluders present (though not visible) in the scene.

Occluders are beneficial because they enable or provide for the improved placement of holograms in a MR scene/environment. By knowing the positional and depth information of objects in the scene, where each object has its own respective occluder, the embodiments are able to provide realistic holograms or holographic visualizations reflective of real-world occurrences. FIG. 15 is illustrative of this concept.

FIG. 15 shows a MR environment 1500 in which the different HMDs of FIG. 13 are operating, including HMD 1505 (representative of HMD 1305). The different HMDs have and/or are transmitting their respective occluders to the other HMDs such that each HMD can utilize the occluders for interaction with their respective depth buffers. In this regard, the HMD 1505 is aware of the person 1510 and the occluder corresponding to that person (e.g., occluder 1410 from FIG. 14) and the person 1515 and the occluder corresponding to that person (e.g., occluder 1415).

Using that information, the HMD 1505 is generating a hologram 1520 in the form of a dragon. Notably, the hologram 1520 is generated from the point of view of the HMD 1505. Notice also, the hologram 1520 is generated to have the appearance of being physically between the person 1515 and the person 1510.

That is, from the point of view of the HMD 1505, the hologram 1520 is more distant relative to the person 1510 but is less distant relative to the person 1515. Here, the person 1510, or rather the occluder 1410, is causing some pixels of the hologram 1520 to be hidden or occluded (e.g., the leg of the dragon is partially hidden) while the hologram 1520 is itself occluding the person 1515. The occluder 1410, which corresponds to the person 1510, is providing the ability to realistically hide or prevent certain pixels of the hologram 1520 from being visually displayed, thereby giving the illusion or impression that the dragon is physically farther away from the HMD 1505 as compared to the person 1510.

Figure 16:
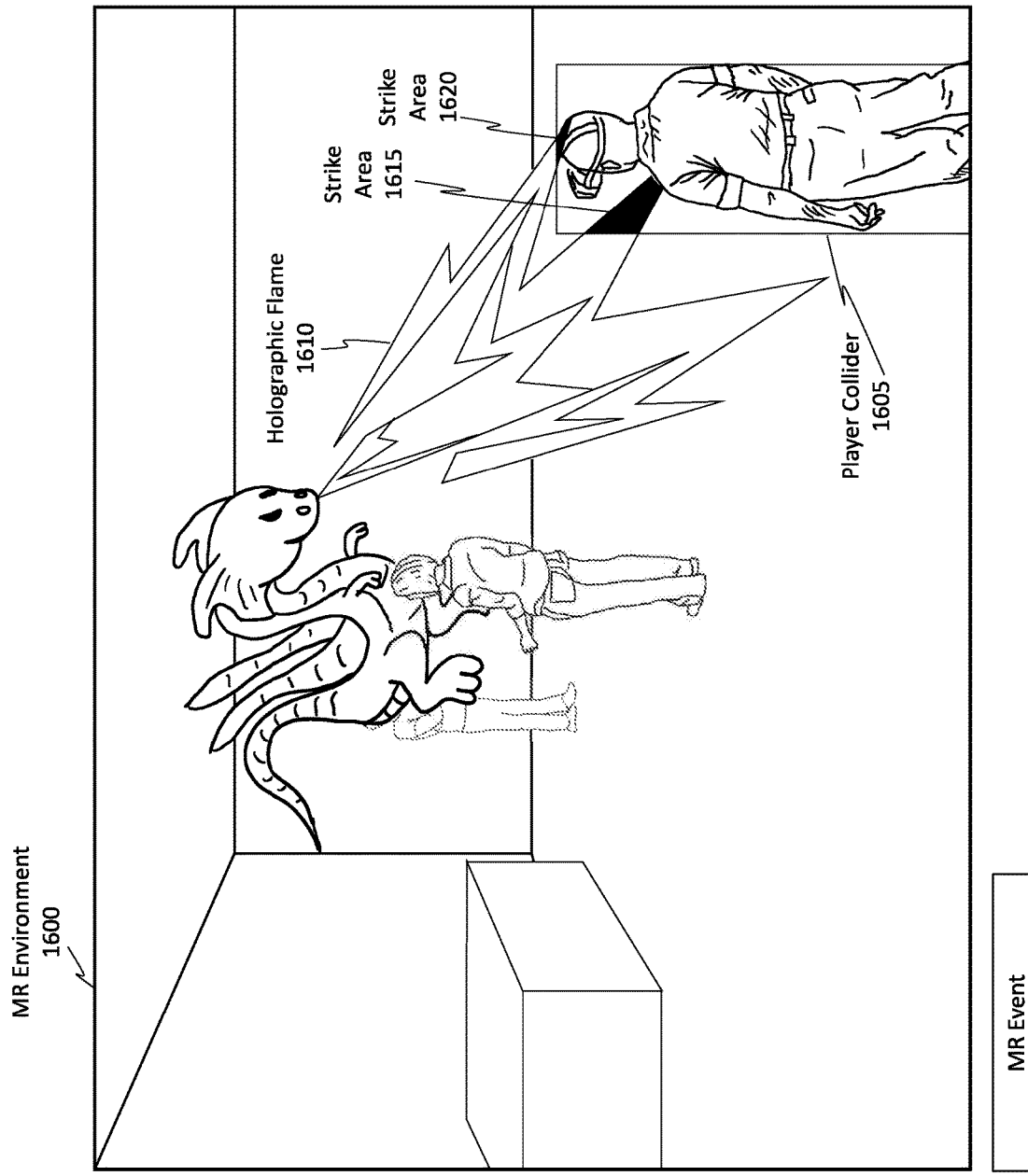
FIG. 16 illustrates an example use case in which a player collider (i.e. a type of occluder) is present in the scene in order to determine whether a hologram (e.g., the dragon's fire breath) is striking the real-world person.

In addition to using occluders to improve how holograms are visually displayed, the embodiments are also able to use occluders to determine when a hologram virtually "contacts" a person via use of a so-called "player collider" or "hit box." FIG. 16 is illustrative.

FIG. 16 shows a MR environment 1600, which is representative of the MR environment 1500 of FIG. 15. Using the occluder 1405 from FIG. 14, the embodiments are able to generate the player collider 1605, which is used to determine whether or not virtual content has touched or struck a person.

For instance, the holographic dragon is shown in FIG. 16 as emitting a holographic flame 1610. Using the player collider 1605, the embodiments are able to determine or discern where, when, and how the holographic flame 1610 virtually contacts the person wearing the HMD. In this scenario, the holographic flame 1610 is contacting the person as shown by the strike area 1615 and the strike area 1620.

In some embodiments, the player collider 1605 may be shaped, oriented, or configured to correspond to the shape of the person's respective occluder. In this case, the occluder can operate as the player collider.

In some embodiments, the player collider 1605 may be abstracted or simplified to achieve various levels of granularity. For instance, a player collider mimicking the shape of a person's actual pose will have a high level of granularity while a player collider formed in the shape of a box (as shown in FIG. 16) will have a lower level of granularity. In this regard, the player collider can be thought of as a less detailed or simplified occluder.

The player collider 1605 is beneficial because it can be used by the HMD to determine when holograms virtually contact a person wearing the HMD. For instance, the HMD will be able to discern that the dragon's fire breath is striking the person at multiple locations. If this MR scene is a part of a game, then the HMD can use the strike areas 1615 and 1620 to perhaps lower the gaming life of the player playing the game (e.g., because he was hit with fire). Of course, the concepts can be applied in other scenarios as well, such as first responder training and so forth.

The action of the holographic flame 1610 striking the person constitutes a MR event 1625 and may be used to impact subsequent play of the game or subsequent visual effects in the MR scene. That is, triggering the MR event 1625 may alter how the MR scene behaves when holographic content virtually touches or strikes a person wearing the HMD. One example could be to visually display a red hologram when the user is struck with fire. Of course, these are examples only, and the broader principles should be applied.

Example Method(s)

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 17:
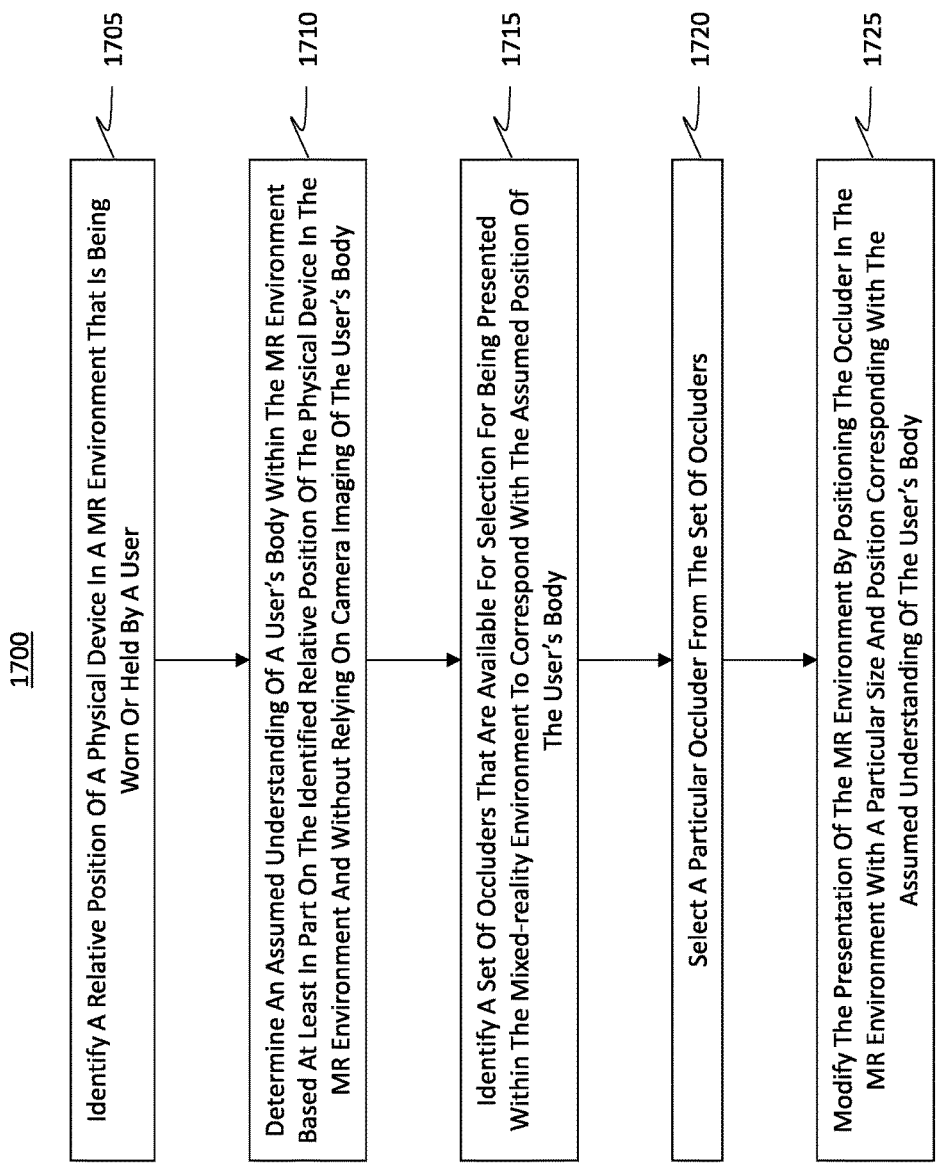
FIG. 17 illustrates a flowchart of an example method for dynamically selecting and presenting an occluder in a MR environment/scene, where the occluder is configured based on assumptions related to the user's body.

Attention will now be directed to FIG. 17, which illustrates a flowchart of an example method 1700 for dynamically selecting and presenting an occluder in a mixed-reality environment, where the occluder is designed or configured based on assumptions of a user's body in the mixed-reality environment. Initially, method 1700 includes an act (act 1705) of identifying a relative position of a physical device in a MR environment. Here, the physical device is being worn or held by a user. An example of the physical device may be any of the HMDs and/or handheld instruments mentioned earlier. Additionally, the relative movements and positioning of the physical device are being tracked in the MR environment based on one or more sensor outputs.

For instance, suppose the physical device is the HMD 505 shown in FIG. 5 (i.e. the physical device comprises an HMD device that is worn by the user). The relative movements and positioning of the HMD 505 are being tracked using the sensor(s) 525 in order to determine the 6 DOF pose 545 of the HMD 505. In some cases, the physical device comprises a handheld instrument, as was discussed earlier. In some cases, the physical device may actually be multiple devices operating in conjunction with one another, such as the HMD and the handheld device.

Method 1700 continues with an act (act 1710) of determining an assumed understanding of the user's body within the MR environment. This assumed understanding is based at least in part on the identified relative position of the physical device in the MR environment and is assumed without a reliance on camera imaging (or at least constant camera imaging) of the user's body. Furthermore, the assumed understanding of the user's body includes at least an assumed position of the user's body. Using FIG. 7 as an example, the person wearing the device 725 is illustrated as being in a crouched position. Based on the sensor data detailing the 6 DOF pose of the device 725 and perhaps based on data acquired from an initial calibration (e.g., to determine whether the person is a male, female, adult, child, etc.), the embodiments are able to generate an assumed understanding 730 of the person's pose, which assumed understanding 730 is based at least in part on the pose of the device 725.

Method 1700 then includes an act (act 1715) of identifying a set of occluders that are available for selection for being presented within the MR environment to correspond with the assumed position of the user's body. As described earlier, the embodiments are able to maintain a library 400 of occluders that may initially be used and perhaps later refined, configured, or modified in an effort to more fully align the selected occluder with the assumed body position. By "present," it is meant that the occluder is permitted to operate with the MR environment's depth buffer. In some cases, "present" can include refraining from visually displaying the occluder while in other cases "present" can include visually displaying the occluder or a portion of the occluder.

Method act 1720 involves selecting a particular occluder from the set of occluders. The selection of the particular occluder is based on the assumed understanding of the user's body within the MR environment. The selection may also be performed by selecting the particular occluder that is determined to have a higher percentage of correspondence to the assumed position of the user's body as compared to other occluders in the set of occluders. For instance, the occluder part 1010 in FIG. 10 was determined to have a higher percentage of correspondence 1030 relative to the person's arm as compared to the occluder part 1025.

In some implementations, the occluder may comprise a player collider box. In this scenario, the process of presenting the occluder in the MR environment may potentially involve defining a relative position of the player collider box within the MR environment without generating or rendering a hologram within the MR reality environment to reflect placement of the player collider box. That is, the player collider box may be transparent in the MR scene, yet it is used to determine when a hologram has virtually touched or contacted the user.

Method 1700 then includes an act (act 1725) of modifying the presentation of the MR environment by positioning the occluder in the MR environment with a particular size and position corresponding with the assumed understanding of the user's body. It should be noted that "positioning" the occluder in the MR environment does not necessarily mean that the MR environment will visually display the selected occluder. Instead, in this context, "positioning" the occluder refers to the case where the occluder interacts with the system's depth buffer so that the MR environment will accurately reflect the placement of holograms. Although in some cases the occluder may be visually displayed (e.g., the process of modifying the presentation of the MR environment may include rendering the occluder as a hologram), it is typically the case that the occluder is fully transparent or not visible to the person immersed in the MR scene. That is, the occluder operates in the background to ensure that the visual display of holograms accurately reflects real-world expectations (in terms of visual appearance and hiding pixels).

In some cases, modifying the presentation of the MR environment includes occluding visibility to at least one user of an object in the MR environment when it is determined the occluder is positioned between the object and the at least one user. FIG. 15 is illustrative of this concept in that the occluder for the person 1510 is occluding pixels of the hologram 1520, and the hologram 1520 is occluding the person 1515. Accordingly, method 1700 generally relates to a technique for configuring an occluder based on the assumed position of a person's body, where the assumed positioned is determined using pose data acquired from a device used by the person.

Figure 18:
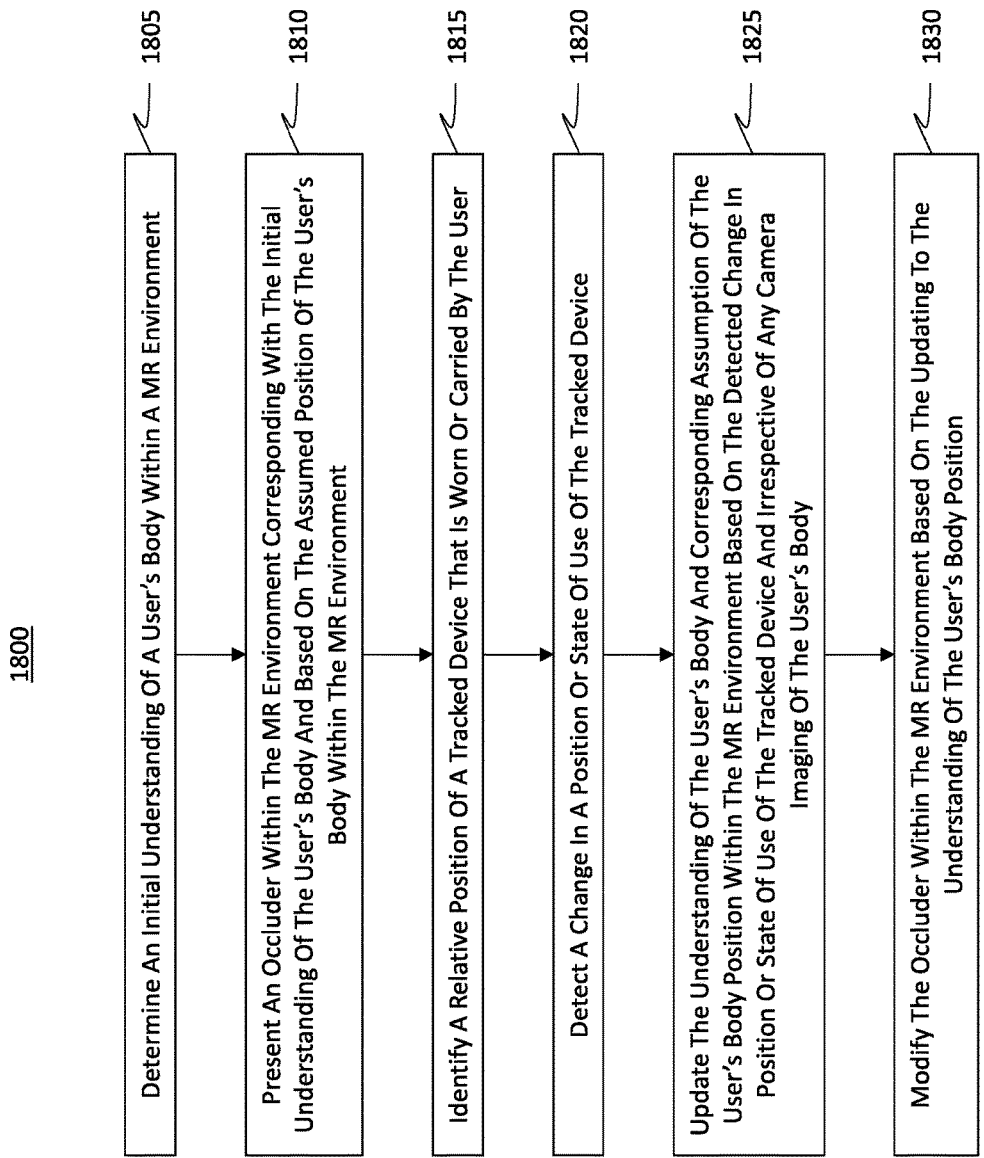
FIG. 18 illustrates a flowchart of an example method for dynamically updating an understanding of the user's body and for modifying an occluder associated with that user's body, where the occluder is configured based on an assumed position of the user's body.

Attention will now be directed to FIG. 18, which illustrates a flowchart of an example method 1800 for dynamically updating an understanding of a user's body in a MR environment and for modifying an occluder for the user, where the occluder is configured based on an assumed position of the user's body within the MR environment.

Method 1800 includes an act (act 1805) of determining an initial understanding of a user's body within a MR environment. In this scenario, the assumed understanding of the user's body includes at least an assumed position of the user's body, as has been described in detail throughout the various figures.

In some cases, though not necessarily all, the initial understanding of the user's body includes a determination of the user's body position within the MR environment based on an initial set of images/scans of the user's body, as captured by one or more cameras of the user's HMD and/or a third-party device/system that scans the MR environment. For instance, perhaps an initial calibration, as discussed earlier, is conducted in order to generate a baseline understanding of the user and/or the environment. In some embodiments, the process of updating the understanding of the user's body, where the update occurs subsequent to the initial camera imaging or calibration, is then performed without performing and/or relying on new scanning/imaging of the user's body and/or environment, and for at least a predetermined period of time.

Method 1800 then includes an act (act 1810) of presenting (optionally displaying but not necessarily displaying) an occluder within the MR environment, where the occluder corresponds with the initial understanding of the user's body and is based on the assumed position of the user's body within the MR environment. In some embodiments, as was described in FIG. 9, the assumed understanding of the user's body may be based on the relative position of the tracked device (e.g., a HMD) in the MR environment in combination with a determined relative position of a second tracked device (e.g., a handheld physical device) in the MR environment.

Act 1815 involves identifying a relative position of a tracked device that is worn or carried by the user. Here, the tracked device comprises a physical device. As described earlier, the tracked device may be an HMD, a handheld device/instrument, or perhaps a device worn or otherwise carried by the user.

A change in a position or state of use of the tracked device is detected in act 1820. In response, act 1825 involves updating the understanding of the user's body and corresponding assumption of the user's body position within the MR environment based on the detected change in position or state of use of the tracked device. Beneficially, this operation (and others) is performed irrespective of any camera imaging of the user's body. In some implementations, the process of updating the understanding of the user's body and corresponding assumption of the user's body position within the MR environment is based on the detected change in state of use of the tracked device. For instance, in some cases, the change in state of use may comprise a change from active use to inactive use or, alternatively, a change from inactive use to active use.

Method 1800 then includes an act (act 1830) of modifying the occluder within the MR environment based on the update to the understanding of the user's body position. Modifying the occluder may be performed in a number of ways, including changing a size, shape, or orientation of the occluder. Additionally, modifying the occluder may be performed by changing a configuration of the occluder from a first configuration to a second configuration selected from any number of different configurations of the occluder. In this example scenario, the second configuration may be selected in response to a determination that the second configuration has a higher percentage of correspondence to an assumed position of the user's body in the MR environment based on the change in state of use of the tracked device as compared to other configurations of the occluder. FIG. 10 was representative of these operations in which an occluder, or at least a portion of an occluder, was selected because it had the highest level of correlation or correspondence to the user's assumed body position as compared to other available occluders. Additionally, FIGS. 11 and 12, which described operations corresponding to updating occluders based on movement and/or state, generally relate to the operations described in method 1800.

Figure 19:
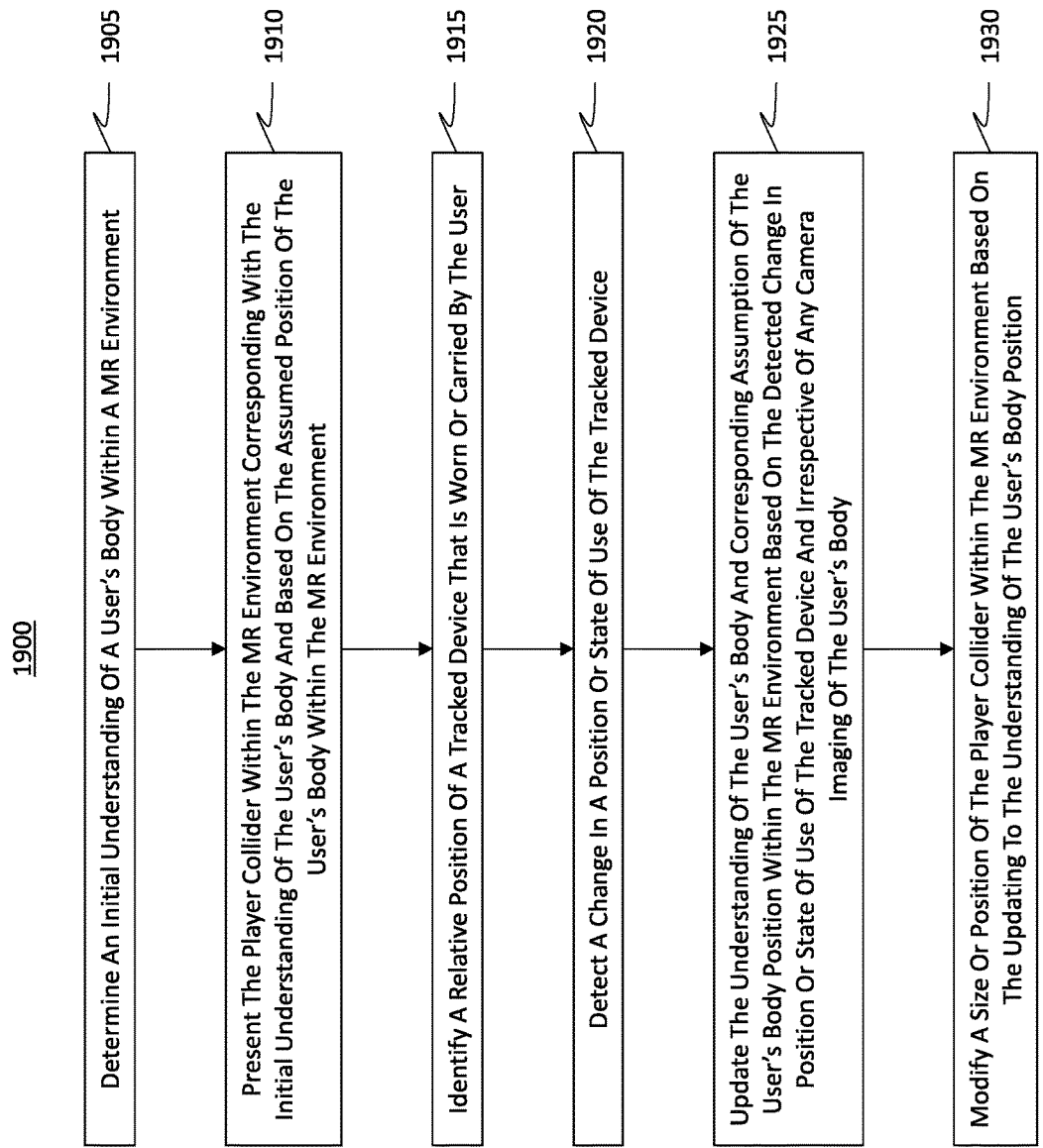
FIG. 19 illustrates a flowchart of an example method for dynamically updating a so-called "player collider" or "hit box" of a user, where the player collider is configured based on an understanding of the user's body.

Attention will now be directed to FIG. 19, which illustrates a flowchart of an example method 1900 for dynamically updating a player collider for a user within a MR environment based on an understanding of the user's body within the MR environment. Here, the player collider comprises a defined region associated with the user's body, such as the player collider 1605 from FIG. 16. As described earlier, a player collider is a type of occluder that may or may not be modified in various ways. For instance, the shape or size of the player collider may correspond with the shape and size of the user while in other cases the shape or size of the player collider may be an abstracted version or less granular version of a detailed occluder matching the size and shape of the user.

Method 1900 includes an act (act 1905) of determining an initial understanding of a user's body within a MR environment. Notably, the assumed understanding of the user's body includes at least an assumed position of the user's body.

In some optional cases, the process of determining the initial understanding of the user's body within the MR environment is based on camera images of the user's body, such as perhaps during an initial calibration process or perhaps during a subsequent or periodic re-synchronization process. As another option, the process of determining the initial understanding of the user's body within the MR environment may be based on assumptions of use associated with the tracked device and sensor data that defines the relative position of the tracked device within the MR environment and without relying on camera images of the user's body within the MR environment.

Act 1910 involves presenting the player collider within the MR environment (but perhaps without rendering or displaying the player collider in the MR environment), where the player collider corresponds with the initial understanding of the user's body and is based on the assumed position of the user's body within the MR environment. In some implementations, the process of presenting the player collider does involve rendering or displaying the player collider within the MR environment as a visual representation of the user's body. In some cases, an application executing in the MR environment (or perhaps is executing to provide the MR environment) will trigger a MR event when an object (e.g., a hologram) in the MR environment and the player collider spatially intersect or collide in the MR environment.

In some embodiments, the player collider is the occluder described herein. In some embodiments, the player collider is a combination of the occluder and an additional buffer region surrounding the occluder. In some cases, the player collider is a box or rectangular prism that is formed based on the dimensions of the occluder and that behaves in a manner similar to the occluder. In some implementations, the occluder has a detailed correlation to the size, shape, and outlines of the person, but the player collider is less granular or less detailed and is generated to be more abstract relative to the occluder (e.g., perhaps the player collider is formed of simple shapes, like cylinders, spheres, and so forth).

Optionally, the MR event includes determining that the object has intersected with or collided with the user's body even when no collision or intersection has actually occurred (e.g., the interaction is a virtual, not real, interaction between a hologram and a real-world object or other hologram). The application executing with the MR environment may then be updated to reflect that the user's body has been intersected with or collided with the object. For instance, the holographic flame 1610 of FIG. 16 colliding or striking the player collider 1605 is representative of the MR event described earlier.

Act 1915 involves identifying a relative position of a tracked device that is worn or carried by the user, where the tracked device comprises a physical device. Then, there is an act (act 1920) of detecting a change in a position or state of use of the tracked device.

In response, method 1900 includes an act (act 1925) of updating the understanding of the user's body and corresponding assumption of the user's body position within the MR environment based on the detected change in position or state of use of the tracked device. This update is beneficially performed irrespective of any camera imaging of the user's body. For instance, the embodiments can prevent or refrain from scanning the environment (for at least a period of time) in order to reduce compute and battery usage. Subsequently, act 1930 involves modifying a size or position of the player collider within the MR environment based on the updating to the understanding of the user's body position.

Optionally, the method may further include an act of preventing a hologram rendered in the MR environment from intersecting the player collider. For instance, if the hologram were to intersect the player collider, or perhaps the user, then it may be the case that the phenomenon illustrated in FIG. 1 may occur, where the holographic glasses arms 110 and 115 appear when they should not. To prevent such a scenario, some embodiments may cause pixels that intersect the player collider to be hidden, as illustrated by the lack of holographic glasses arms in the hologram 125 of FIG. 1. In some cases, pixels intersecting or colliding with the player collider may trigger the appearance of new hologram content, such as perhaps a red flash to indicate the user has been "hit" by the dragon's flame.

Accordingly, the disclosed embodiments are able to beneficially configure an occluder or player collider based on an assumption regarding the size, shape, and orientation of a person holding or wearing a tracked device (e.g., an HMD, handheld instrument, etc.). By performing the disclosed operations, the embodiments are able to reduce expenses associated with compute usage and are further able to reduce battery usage by refraining from continuously scanning the environment.

Example Computer/Computer Systems

Figure 20:
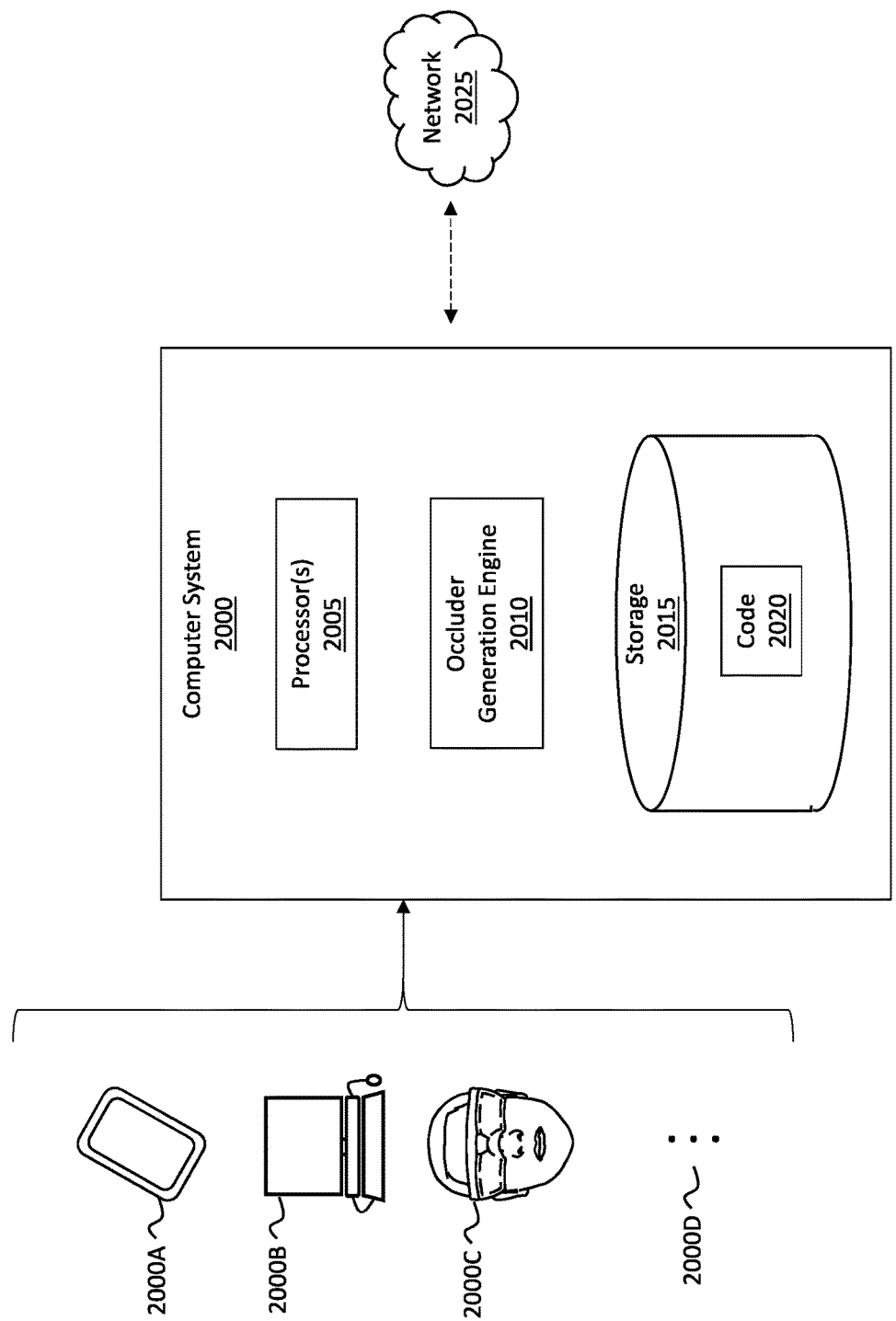
FIG. 20 illustrates an example computer system that is configurable to perform any of the disclosed operations.

Attention will now be directed to FIG. 20 which illustrates an example computer system 2000 that may include and/or be used to perform any of the operations described herein. Computer system 2000 may take various different forms. For example, computer system 2000 may be embodied as a tablet (2000A), a desktop or laptop (2000B), a wearable device (e.g., HMD 2000C), a mobile device, a standalone device, or any other embodiment as represented by the ellipsis 2000D. Computer system 2000 may also be a distributed system that includes one or more connected computing components/devices that are in communication with computer system 2000.

In its most basic configuration, computer system 2000 includes various different components. FIG. 20 shows that computer system 2000 includes one or more processor(s) 2005 (aka a "hardware processing unit"), an occluder generation engine 2010, and storage 2015.

Regarding the processor(s) 2005, it will be appreciated that the functionality described herein can be performed, at least in part, by one or more hardware logic components (e.g., the processor(s) 2005). For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

The occluder generation engine 2010 may be implemented as a specific processing unit (e.g., a dedicated processing unit as described earlier) configured to perform one or more specialized operations for the computer system 2000, such as the methods recited herein. As used herein, the terms "executable module," "executable component," "component," "module," or "engine" can refer to hardware processing units or to software objects, routines, or methods that may be executed on computer system 2000. The different components, modules, engines, and services described herein may be implemented as objects or processors that execute on computer system 2000 (e.g. as separate threads). The occluder generation engine 2010 (or perhaps even just the processor(s) 2005) can be configured to perform any of the disclosed method acts or other functionalities.

Storage 2015 may be physical system memory, which may be volatile, non-volatile, or some combination of the two. The term "memory" may also be used herein to refer to non-volatile mass storage such as physical storage media. If computer system 2000 is distributed, the processing, memory, and/or storage capability may be distributed as well.

Storage 2015 is shown as including executable instructions (i.e. code 2020). The executable instructions represent instructions that are executable by the processor(s) 2005 (or perhaps even the occluder generation engine 2010) of computer system 2000 to perform the disclosed operations, such as those described in the various methods.

The disclosed embodiments may comprise or utilize a special-purpose or general-purpose computer including computer hardware, such as, for example, one or more processors (such as processor(s) 2005) and system memory (such as storage 2015), as discussed in greater detail below. Embodiments also include physical and other computer-readable media for carrying or storing computer-executable instructions and/or data structures. Such computer-readable media can be any available media that can be accessed by a general-purpose or special-purpose computer system.

Computer-readable media that store computer-executable instructions in the form of data are one or more "physical/hardware computer storage media" or "physical/hardware storage device(s)" that are distinguished from and that exclude mere transmission or transitory media. In contrast, computer-readable media that merely carry computer-executable instructions are "transmission media". Thus, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 2000 may also be connected (via a wired or wireless connection) to external sensors (e.g., one or more remote cameras) or devices via a network 2025. For example, computer system 2000 can communicate with any number devices or cloud services to obtain or process data. In some cases, network 2025 may itself be a cloud network. Furthermore, computer system 2000 may also be connected through one or more wired or wireless networks 2025 to remote/separate computer systems(s) that are configured to perform any of the processing described with regard to computer system 2000.

A "network," like network 2025, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 2000 will include one or more communication channels that are used to communicate with the network 2025. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for dynamically selecting and presenting an occluder in a mixed-reality environment based on assumptions of a user's body in the mixed-reality environment, the method comprising:

identifying a relative position of a physical device in a mixed-reality environment, the physical device is being worn or held by a user, relative movements and positioning of the physical device are tracked in the mixed-reality environment based on one or more sensor outputs;

determining an assumed understanding of a user's body within the mixed-reality environment based at least in part on the identified relative position of the physical device in the mixed-reality environment and without relying on camera imaging of the user's body, the assumed understanding of the user's body including at least an assumed position of the user's body;

identifying a set of occluders that are available for selection for presentation within the mixed-reality environment and that correspond with the assumed position of the user's body;

selecting a particular occluder from the set of occluders, the selection of the particular occluder being based on the assumed understanding of the user's body within the mixed-reality environment and by selecting the particular occluder that is determined to have a higher percentage of correspondence to the assumed position of the user's body than other occluders in the set of occluders; and modifying the presentation of the mixed-reality environment by positioning the occluder in the mixed-reality environment with a particular size and position corresponding with the assumed understanding of the user's body.

2. The method of claim 1, wherein the physical device comprises an HMD (Head Mounted Device) device that is worn by the user.

3. The method of claim 1, wherein the physical device comprises a handheld instrument.

4. The method of claim 1, wherein the assumed understanding of the user's body is based on the relative position of the physical device in the mixed-reality environment in combination with a determined relative position of a second physical device in the mixed-reality environment, wherein the physical device is an HMD (Head Mounted Device) device that is worn by the user and the second physical device is a handheld physical device.

5. The method of claim 1, wherein the assumed understanding of the user's body is based on the relative position of the physical device in combination a determined state of intended use or actual use of the physical device in the mixed-reality environment.

6. The method of claim 5, wherein the physical device comprises a handheld instrument, and wherein the assumed understanding of the user's body within the mixed-reality environment includes determining an assumed position of an arm of the user based on the determined state of the handheld instrument within the mixed-reality environment.

7. The method of claim 6, wherein the method further includes detecting a change in the determined state of the handheld instrument within the mixed-reality environment and modifying at least one of a selection of the particular occluder or a shape or position of the particular occluder based on the detected change in the determined state of the handheld instrument and irrespective of any change in relative positioning of the handheld instrument within the mixed-reality environment.

8. The method of claim 1, wherein modifying the presentation of the mixed-reality environment includes occluding visibility to at least one user of an object in the mixed-reality environment when it is determined the occluder is positioned between the object and the at least one user.

9. The method of claim 1, wherein the assumed understanding of the user's body comprises a determination that the user is standing and a determination how tall the user is.

10. The method of claim 1, wherein the assumed understanding of the user's body comprises a determination that the user is laying down and a determination of a relative direction the user is laying within the mixed-reality environment.

\* \* \* \* \*